US008698625B2

United States Patent
Schneider et al.

(10) Patent No.: US 8,698,625 B2
(45) Date of Patent: Apr. 15, 2014

(54) SYSTEMS AND METHODS FOR PROVIDING SECURITY AT A VEHICLE YARD

(75) Inventors: Charles R. Schneider, Alpharetta, GA (US); James P. Boylan, Jr., Brunswick, OH (US)

(73) Assignee: U.S. Security Associates, Inc., Roswell, GA (US)

( * ) Notice: Subject to any disclaimer, the term of this patent is extended or adjusted under 35 U.S.C. 154(b) by 0 days.

(21) Appl. No.: 13/424,216

(22) Filed: Mar. 19, 2012

(65) Prior Publication Data

US 2012/0176242 A1 Jul. 12, 2012

Related U.S. Application Data

(63) Continuation of application No. 12/176,048, filed on Jul. 18, 2008, now abandoned.

(60) Provisional application No. 60/950,373, filed on Jul. 18, 2007.

(51) Int. Cl.
*G08B 21/00* (2006.01)
(52) U.S. Cl.
USPC .............................. 340/540; 340/542; 340/5.7

(58) Field of Classification Search
USPC ........... 340/506, 539.3, 573.1, 539.1, 539.11, 340/438, 439, 442, 447, 453, 576; 702/33, 702/61, 83, 187, 108, 122
See application file for complete search history.

(56) References Cited

U.S. PATENT DOCUMENTS

| 2002/0022984 A1* | 2/2002 | Daniel et al. ....................... 705/8 |
| 2005/0068152 A1* | 3/2005 | Umehara et al. ................. 340/5.8 |
| 2006/0082439 A1* | 4/2006 | Bazakos et al. ............. 340/5.82 |
| 2006/0090101 A1* | 4/2006 | Schneider et al. .............. 714/38 |

\* cited by examiner

*Primary Examiner* — Nabil Syed
(74) *Attorney, Agent, or Firm* — Sutherland Asbill & Brennan LLP

(57) ABSTRACT

Systems and methods for providing security at a vehicle yard are provided. A communicator may collect data associated with a plurality of vehicles or trailers during completion of a guard tour, and a processing station may receive the collected data from the communicator. The processing station may compare the collected data to expected data in order to generate one or more instructions that are returned to the communicator. The one or more instructions may include an instruction to collect additional data associated with a vehicle or trailer.

20 Claims, 16 Drawing Sheets

FIG. 7A

Trailer Movement Tracking

Distribution Center: Tampa

Enter Trailer Number

Enter Trailer Company: All  Or

Enter Yard Entry Date Range: 5/2/07 to 5/4/07  And

○ Rank by Entering Yard Date
○ Rank by Exiting Yard Date

| Trailer Company | Number | Entered Yard Date | Entered Yard Time | Seal No. | Reported in Yard Date | Reported in Yard Time | Exited Yard Date | Exited Yard Time | Seal No. | Exit Bill of Lading No. | Destination |
|---|---|---|---|---|---|---|---|---|---|---|---|
| C. Bean Transport | 235489 | 5/2/07 | 7:12 AM | 3124619 | 5/2/07 | 8:45 AM | 5/2/07 | 2:24 PM | 7845126 | 15265 | Chicago |
| J.B. Hunt | 523486 | 5/2/07 | 8:45 AM | Empty | 5/2/07 | 3:58 PM | 5/3/07 | 10:35 AM | 1223567 | 12335666 | Denver |
| Schneider National | 256293 | 5/2/07 | 9:14 AM | 5462369 | 5/2/07 | 10:35 AM | 5/2/07 | 4:25 PM | 1256856 | 215656549 | Los Angeles |
| Hunt Transportation | 456896 | 5/2/07 | 10:35 AM | Empty | 5/2/07 | 4:25 PM | 5/3/07 | 2:13 PM | 1245786 | 212654638 | Buffalo |
| Jevic Transportation | 125875 | 5/2/07 | 1:47 PM | 84566985 | 5/2/07 | 2:13 PM | 5/4/07 | 7:12 AM | 1548596 | 78562 | Jacksonville |
| Arrow Trucking | 145876 | 5/2/07 | 2:15 PM | Empty | 5/3/07 | 8:45 AM | 5/3/07 | 1:47 PM | 5926563 | 15594 | Houston |
| National Freight | 156959 | 5/2/07 | 2:45 PM | 7859264 | 5/2/07 | 3:58 PM | 5/4/07 | 10:35 AM | 4859236 | 64949494 | Atlanta |
| Valley Express | 478596 | 5/2/07 | 3:15 PM | 5623156 | 5/2/07 | 12:15 PM | 5/3/07 | 8:45 AM | 3124619 | 31191113 | Miami |
| C. Bean Transport | 856923 | 5/2/07 | 3:40 PM | Empty | 5/3/07 | 9:14 AM | 5/3/07 | 3:58 PM | 5464953 | 3232699 | San Diego |
| TransAm Trucking, Inc. | 751236 | 5/2/07 | 3:58 PM | 5926563 | 5/3/07 | 4:25 PM | 5/4/07 | 3:25 PM | 5462369 | 316218569 | Tulsa |
| Heartland Express | 182393 | 5/3/07 | 8:15 AM | Empty | 5/3/07 | 12:15 PM | 5/3/07 | 2:24 PM | 6262518 | 216516959 | Philadelphia |
| Averitt Express | 316457 | 5/3/07 | 10:35 AM | 7845235 | 5/3/07 | 11:40 AM | 5/4/07 | 7:45 AM | 6456985 | 45896 | Tampa |
| Texas Star Express | 451629 | 5/3/07 | 1:12 PM | Empty | 5/4/07 | 7:12 AM | 5/4/07 | 9:14 AM | 1235879 | 26265859 | Las Vegas |
| C. Bean Transport | 454925 | 5/3/07 | 2:24 PM | 7856231 | 5/4/07 | 1:47 PM | 5/4/07 | 4:25 PM | 1359759 | 216516958 | Birmingham |
| Jevic Transportation | 875469 | 5/3/07 | 3:25 PM | Empty | 5/4/07 | 11:40 AM | 5/4/07 | 12:15 PM | 4859236 | 21651911 | Charlotte |
| Freightmasters, Inc. | 945546 | 5/3/07 | 4:25 PM | 7848596 | 5/4/07 | 11:10 AM | 5/4/07 | 11:40 AM | 7845235 | 216519681 | Phoenix |
| U.S. Trucking | 549562 | 5/4/07 | 10:39 AM | 7845126 | 5/4/07 | 12:15 PM | | 11:40 AM | 8915264 | 12165154 | Pittsburg |
| Yellow Freight | 659595 | 5/4/07 | 11:40 AM | 1223567 | 5/4/07 | 3:25 PM | | 12:15 PM | 5684971 | 45698 | Boston |
| Watkins Motor Lines | 845623 | 5/4/07 | 12:15 PM | 1256956 | 5/4/07 | 2:24 PM | | 3:25 PM | 5946897 | 16546489 | Austin |
| Jevic Transportation | 485963 | 5/4/07 | 2:13 PM | 1245786 | 5/4/07 | 7:45 PM | | 2:24 PM | 4562359 | 51695464 | Sacramento |

Driver License Exceptions Log/Email

| Carrier | Date Entered | Vehicle Class | Driver Name Last, First | Driver CDL License # | Driver State | Driver Exp Date | Driver Vehicle Class | Exceptions License Expired | Exceptions Drive Not Permitted Admittance | Exceptions Not Licensed for Vehicle Driven (Licensed for) |
|---|---|---|---|---|---|---|---|---|---|---|
| Aventt Express | 5/1/07 | A | Doe, Jane | 12365498 | AL | 4/5/2008 | A | | | A |
| Aventt Express | 4/29/07 | A | Jones, Tim | 23879301 | GA | 5/6/2006 | A | Yes | | A |
| Aventt Express | 5/2/07 | A | Denver, Joe | 57803090 | FL | 5/8/2008 | A | | | B |
| Aventt Express | 5/4/07 | A | Cooper, Alice | 63346200 | FL | 1/2/2007 | A | Yes | | A |
| J.B. Hunt | 4/28/07 | A | Black, Joe | 56781234 | GA | 3/5/2007 | A | Yes | Not Permitted | A |
| J.B. Hunt | 4/29/07 | A | Knight, Star | 84534479 | GA | 4/25/2007 | A | Yes | | A |
| J.B. Hunt | 5/2/07 | A | Adams, Ed | 43173046 | GA | 5/9/2008 | A | | | B |
| J.B. Hunt | 4/30/07 | A | Sands, Stone | 38892344 | AL | 3/26/2007 | A | Yes | | A |
| J.B. Hunt | 5/3/07 | A | Johnson, Ryan | 90344565 | AL | 7/8/2007 | A | | | C |
| Schneider Nat'l | 4/27/07 | A | Gray, Wyatt | 45766868 | TN | 9/21/2006 | A | Yes | | A |
| Schneider Nat'l | 5/3/07 | A | Dean, Les | 69798934 | MS | 4/29/2007 | A | Yes | | C |

Data Entry Error

Highlight Indicates Inconsistent Data for Correction
Controlled with USA Bar Code Tracking

| | | Entering Trailer | | | | | | Exiting Trailer | | | |
|---|---|---|---|---|---|---|---|---|---|---|---|
| Date | Time | Company | Number | License Plate | Bar Code | Date | Time | Company | Number | License Plate | Bar Code |
| 3/10/07 | 8:34 AM | Heartland Express | 235489 | 45648JHK | 00023 | 3/12/07 | 8:29 AM | Heartland Express | 235489 | 55648JHK | 00023 |
| 3/10/07 | 10:29 AM | Aventt Express | 523486 | 45236LKI | 00056 | 3/14/07 | 9:09 AM | J.B. Hunt | 523486 | 45236LKI | 00056 |
| 3/11/07 | 9:38 AM | Texas Star Express | 258293 | 88965IGT | 00096 | 3/13/07 | 3:38 PM | Texas Star Express | 258293 | 88965IGT | 00096 |
| 3/12/07 | 1:38 PM | C. Bean Transport | 456896 | 63679RTF | 00092 | 3/15/07 | 6:07 PM | C. Bean Transport | 456896 | 63679RTF | 00092 |
| 3/12/07 | 3:38 PM | Jevic Transportation | 125875 | 79654HGU | 00002 | 3/15/07 | 5:34 PM | Jevic Transportation | 125875 | 79654HGU | 00002 |
| 4/2/07 | 6:07 PM | Freightmasters, Inc. | 145878 | 45696DFS | 00015 | 4/7/07 | 10:29 AM | Freightmasters, Inc. | 145878 | 45696DFS | 00015 |
| 4/5/07 | 12:09 PM | U.S. Trucking | 156959 | 23489BCX | 00054 | 4/9/07 | 1:38 PM | U.S. Trucking | 156959 | 23489BCX | 00054 |
| 4/12/07 | 8:29 PM | Yellow Freight | 478596 | 67546YHG | 00036 | 4/15/07 | 3:38 PM | Yellow Freight | 578596 | 67546YHG | 00036 |
| 4/29/07 | 9:09 AM | Watkins Motor Lines | 856923 | 90800MNM | 00075 | 5/1/07 | 8:34 AM | Watkins Motor Lines | 956923 | 90800MNM | 00075 |
| 5/3/07 | 8:39 AM | Jevic Transportation | 751236 | 43547ZSI | 00067 | 5/6/07 | 10:29 AM | Schneider National | 751236 | 43547ZSI | 00067 |

Manual Gate Openings

▶ Distribution Center

Entry Date Range from [ 3/29/07 ] to [ 5/4/07 ]

Or

Exit Date Range from [ ] to [ ]

| Entry Gate | | USA Officer on Duty |
|---|---|---|
| Date | Time | |
| 3/29/2007 | 10:35 AM | Smith |
| 4/1/2007 | 1:12 PM | Chips |
| 4/1/2007 | 2:24 PM | Washington |
| 4/16/2007 | 3:25 PM | Filbert |
| 4/16/2007 | 4:25 PM | Mawick |
| 4/25/2007 | 10:39 AM | Fester |
| 4/25/2007 | 11:40 AM | Jones |
| 5/1/2007 | 12:15 PM | Lender |
| 5/4/2007 | 2:13 PM | Thomas |

Outlook

From: USA Command Center
Sent: Thursday, April 26, 2007 4:37 PM
To: Distribution List, X Addresses
Subject: INSTALERT; Possible Missing Trailer A system-generated email initiated within 15 minutes after a trailer has not been counted in a yard audit, and has not been reported exiting the yard.

Distribution Center: Braselton, Georgia

Carrier Name: Carrier A

Trailer Number: 973428

License: State: IL
Number: W7426

Last Yard Inventory: Slot No.: 86
Sealed/Empty: Sealed
Seal No.: 489241
Date: 04/23/2007
Time: 4:22 PM

FIG. 13

SYSTEMS AND METHODS FOR PROVIDING SECURITY AT A VEHICLE YARD

CROSS-REFERENCE TO RELATED APPLICATIONS

The present application is a continuation of co-pending U.S. patent application Ser. No. 12/176,048, entitled "Systems and Methods for Monitoring and Actuating a Vehicle Gate," filed on Jul. 18, 2008, which claims priority to U.S. Provisional Ser. No. 60/950,373, entitled "Gate Monitoring and Truck Yard Audit Systems and Methods," filed on Jul. 18, 2007. The contents of each of these applications are incorporated by reference herein in their entirety.

TECHNICAL FIELD

Embodiments of the invention relate generally to security systems, and more particularly, to systems and methods for providing security at a vehicle yard.

BACKGROUND

In general, a number of vehicles may enter and exit a commercial or industrial site through a controlled access point, such as, an admission gate. Once the vehicles have entered the site, vehicles or trailers may be parked at the site. The operator of the site may be responsible for the security of the vehicles or trailers parked at the site. Accordingly, there is an opportunity for systems and methods that provide security at the site or a vehicle yard associated with the site.

BRIEF DESCRIPTION

Some or all of the above needs and/or problems may be addressed by embodiments of the invention. Embodiments of the invention may include systems and methods for providing security at a vehicle yard. In one embodiment, a communicator for use in a guard tour may be provided. The communicator may include at least one scanning device, at least one network interface, and at least one processor. The at least one scanning device may be configured to collect information associated with a plurality of vehicles or trailers during completion of a guard tour. The at least one network interface may be configured to communicate at least a portion of the collected information to a remote processing station via a network. The at least one processor may be configured to (i) direct a guard to utilize the at least one scanning device to collect information associated with the plurality of vehicles or trailers, (ii) prompt the guard to collect additional information associated with one of the plurality of vehicles or trailers, and (iii) direct the at least one network interface to communicate the collected information and the collected additional information to the remote processing station.

Another embodiment may provide a system for providing security at a vehicle yard. The system may include a communicator and a processing station. The communicator may collect data associated with a plurality of vehicles or trailers during completion of a guard tour, and a processing station may receive the collected data from the communicator. The processing station may compare the collected data to expected data in order to generate one or more instructions that are returned to the communicator. The one or more instructions may include an instruction to collect additional data associated with a vehicle or trailer.

Yet another embodiment may provide a method for providing security at a vehicle yard. A processing station may receive, from a communicator carried by a guard during a guard tour, data collected by the communicator and associated with a plurality of vehicles or trailers evaluated during completion of the guard tour. The processing station may compare the collected data to expected data in order to generate one or more instructions to be returned to the communicator. The one or more instructions may include an instruction to collect additional data associated with a vehicle or trailer. Once generated, the one or more instructions may be communicated by the processing station to the communicator.

Additional systems, methods, apparatuses, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

Figure 1:
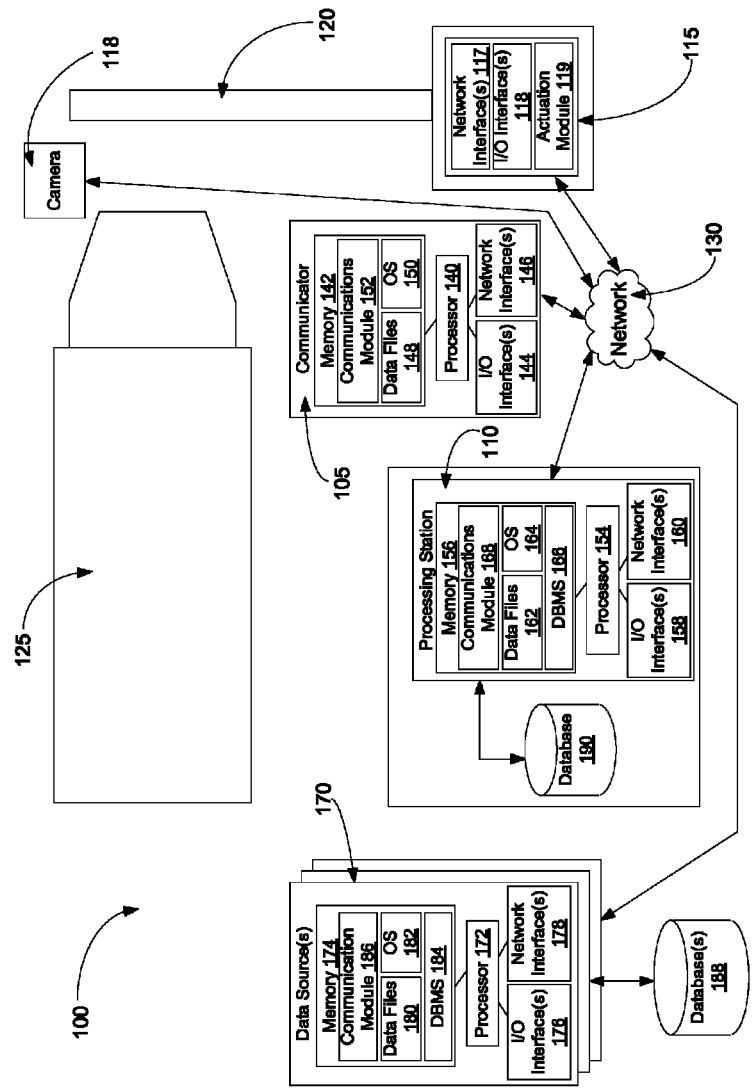

Having thus described the invention in general terms, reference will now be made to the accompanying drawings, which are not necessarily drawn to scale, and wherein:

FIG. 1 is a schematic diagram of one example gate monitoring system, according to an illustrative embodiment of the invention.

Figure 2:
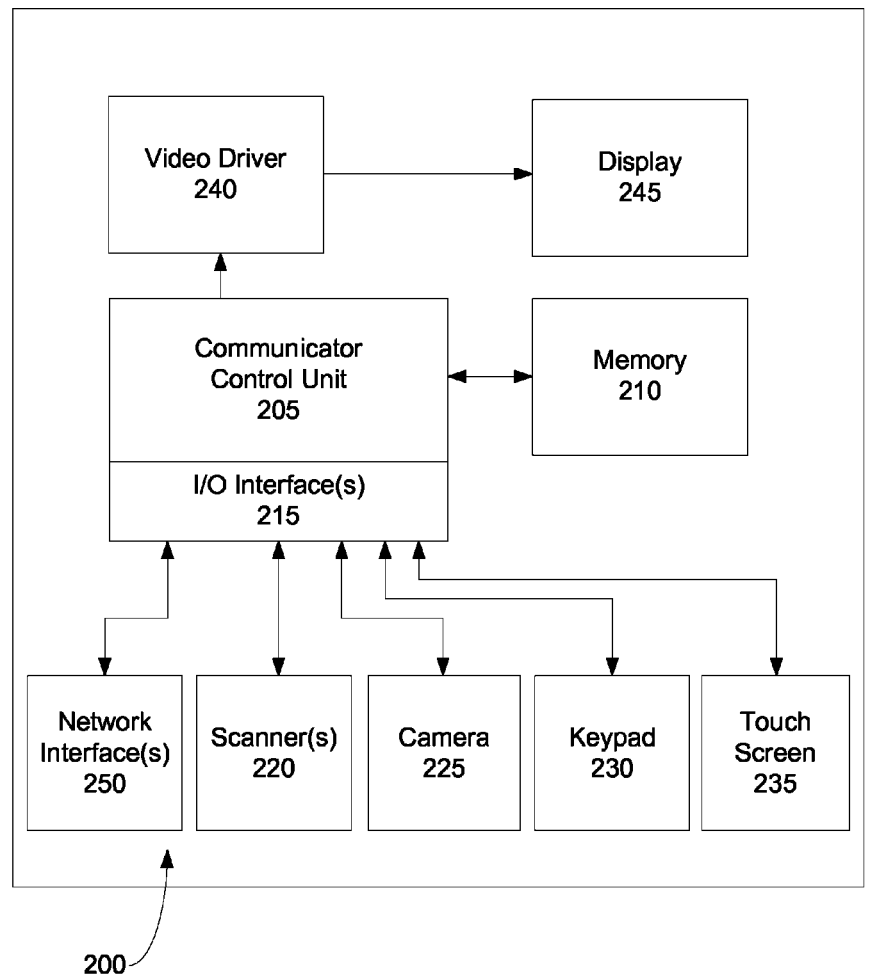

FIG. 2 is a block diagram of one example communicator that may be utilized in accordance with a gate monitoring and actuating system, according to an illustrative embodiment of the invention.

Figure 3:
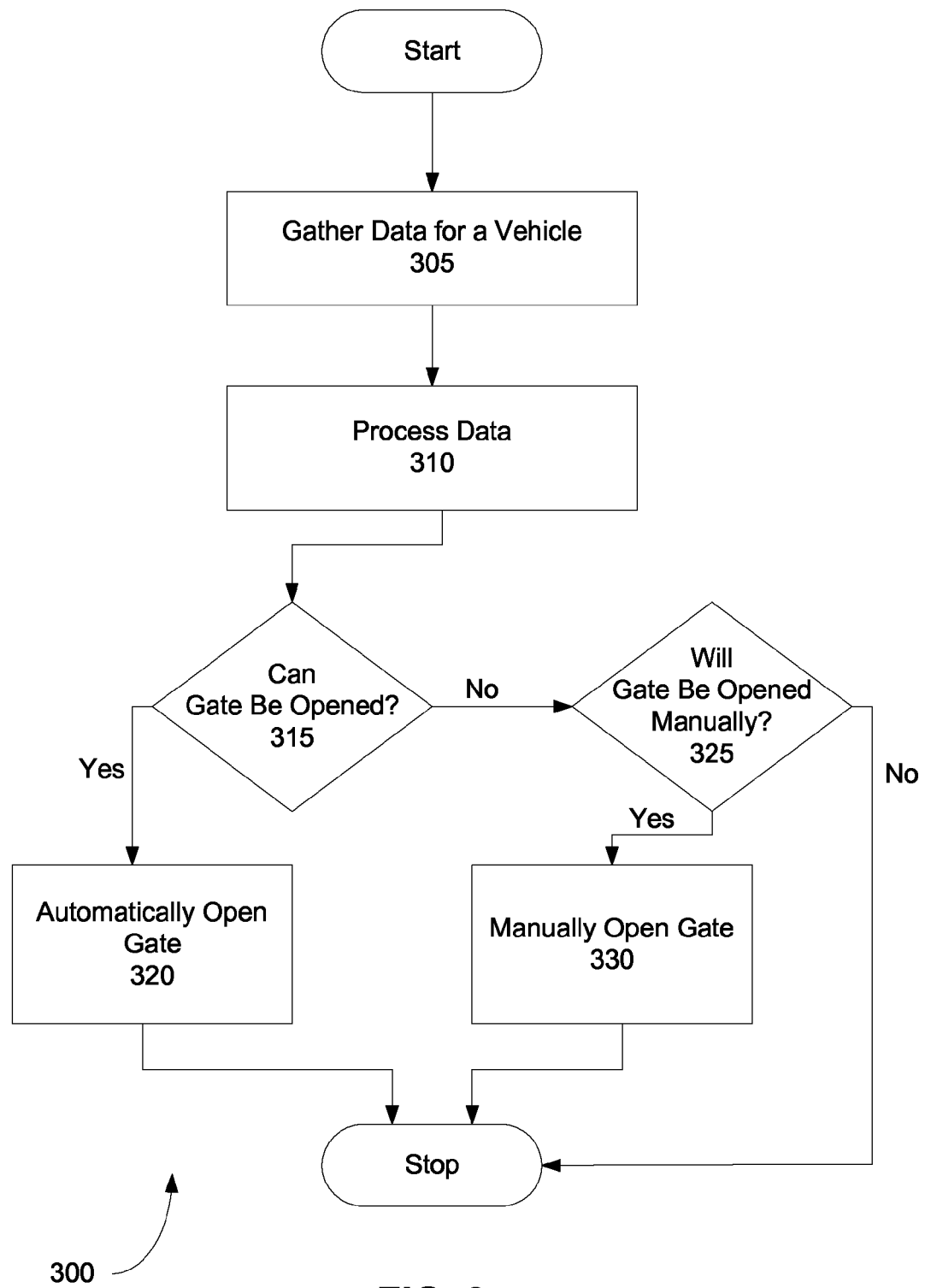

FIG. 3 is one example flowchart of the operation of a gate monitoring and actuating system, according to an illustrative embodiment of the invention.

Figure 4:
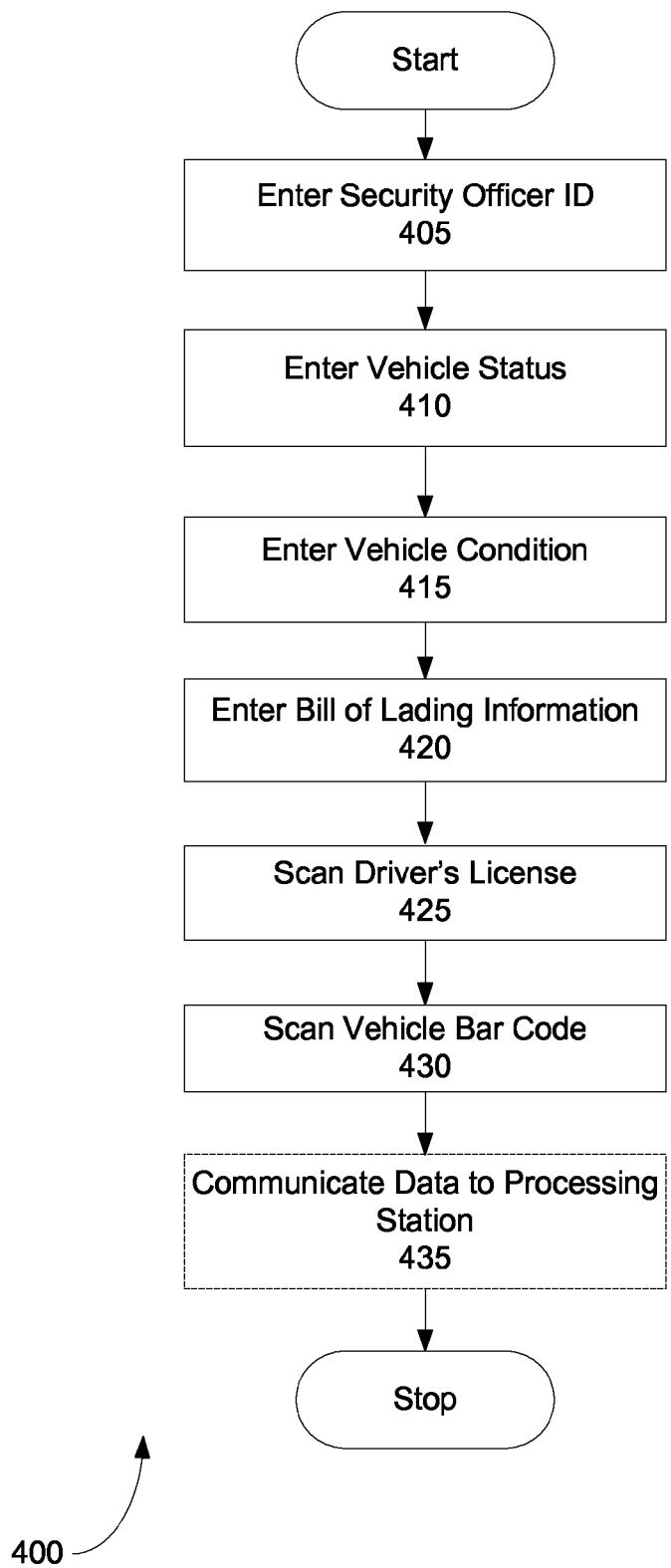

FIG. 4 is one example flowchart of the operation of a communicator to gather data, according to an illustrative embodiment of the invention.

Figure 5:

FIG. 5 is a depiction of one example barcode that may be utilized in accordance with a gate monitoring and actuating system, according to an illustrative embodiment of the invention.

Figure 6:
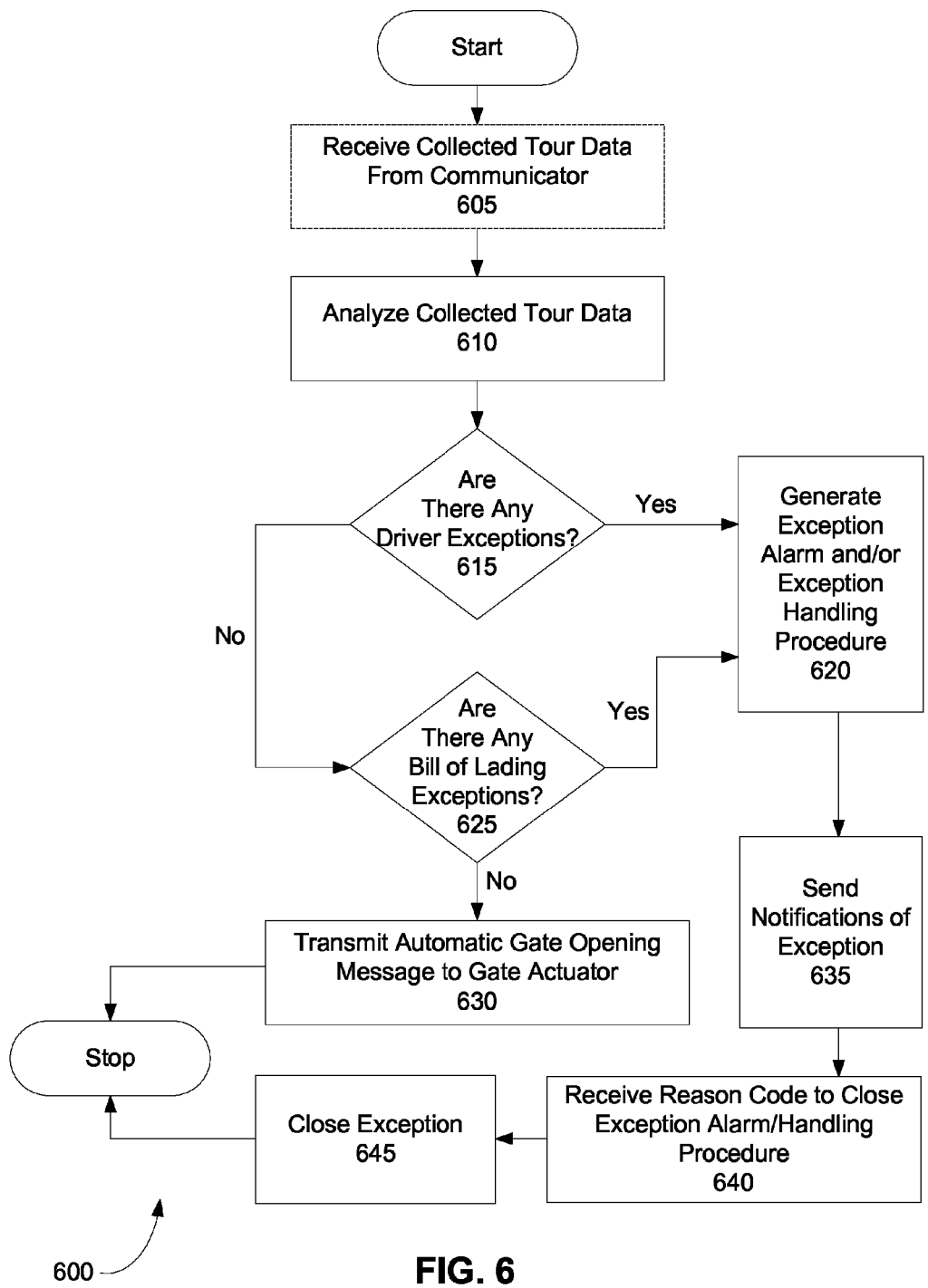

FIG. 6 is one example flowchart of a method for determining whether to open a gate monitored by a gate monitoring and actuating system, according to an illustrative embodiment of the invention.

FIGS. 7A-7D are example reports that may be generated by a gate monitoring and actuating system, according to illustrative embodiments of the invention.

Figure 8:
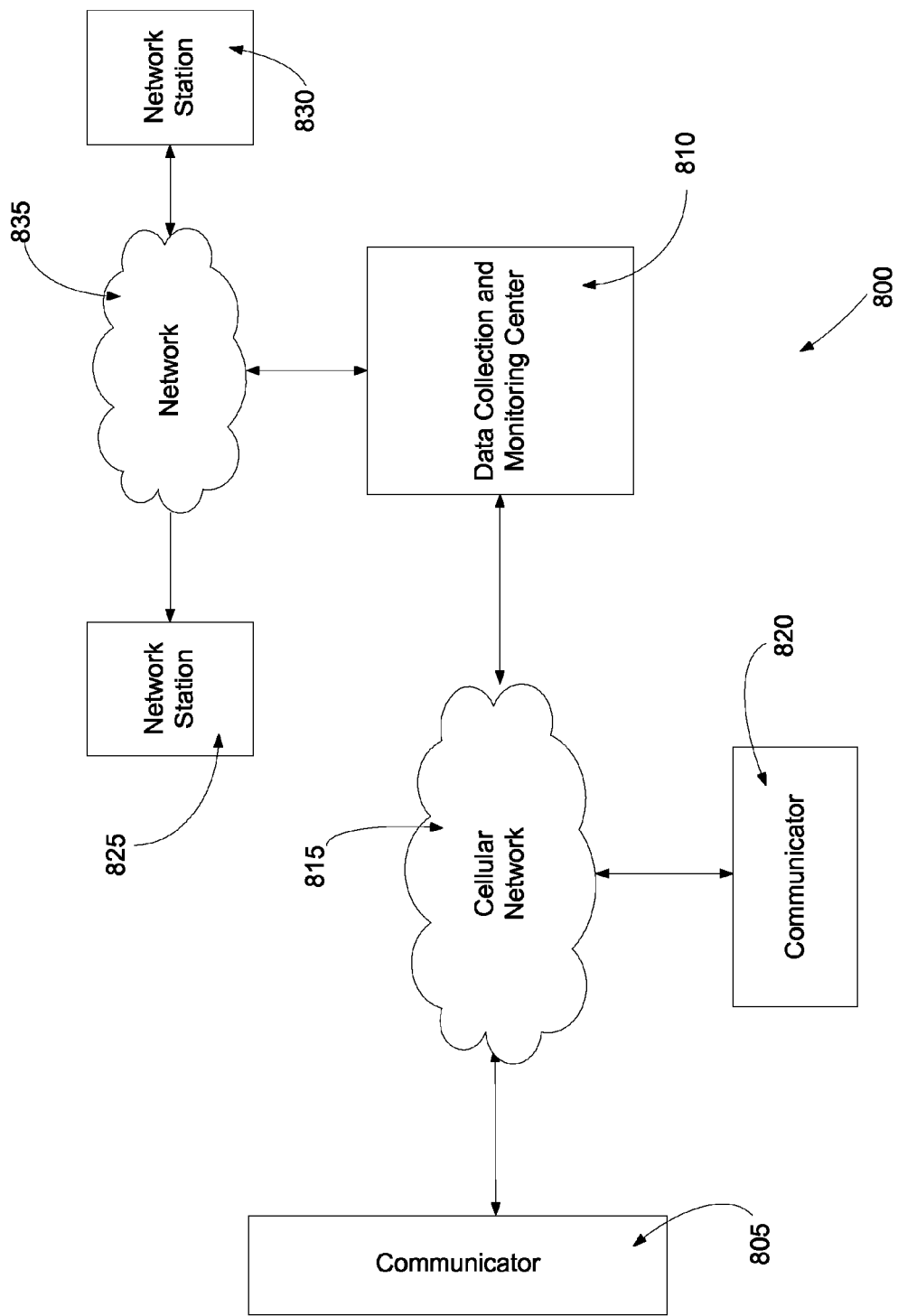

FIG. 8 is a block diagram of one example yard audit system, according to an illustrative embodiment of the invention.

Figure 9:
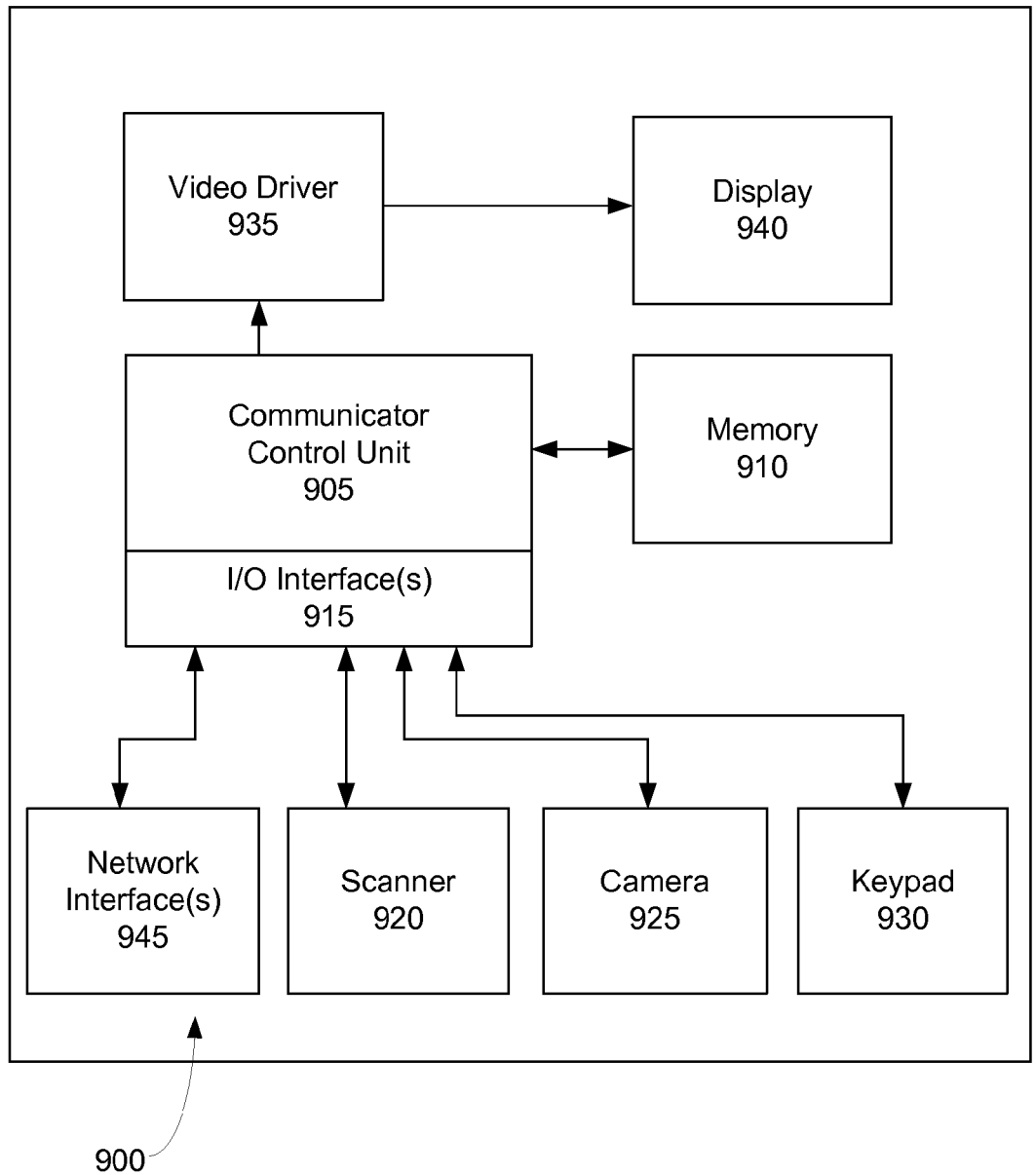

FIG. 9 is a block diagram of one example communicator that may be utilized in accordance with a yard audit system, according to an illustrative embodiment of the invention.

Figure 10:
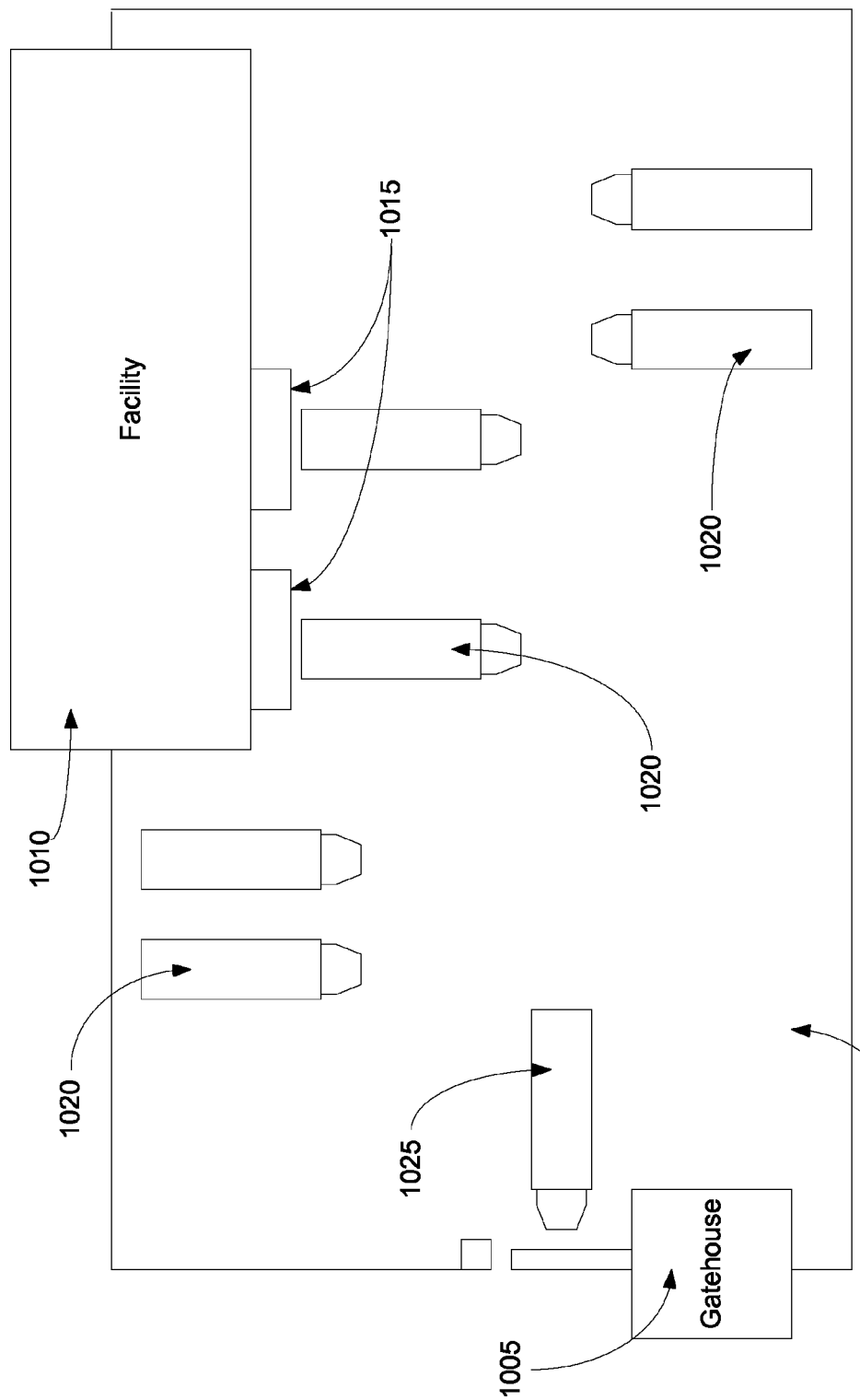

FIG. 10 is a schematic diagram of one example audit tour that may be conducted utilizing a yard audit system, according to an illustrative embodiment of the invention.

Figure 11:
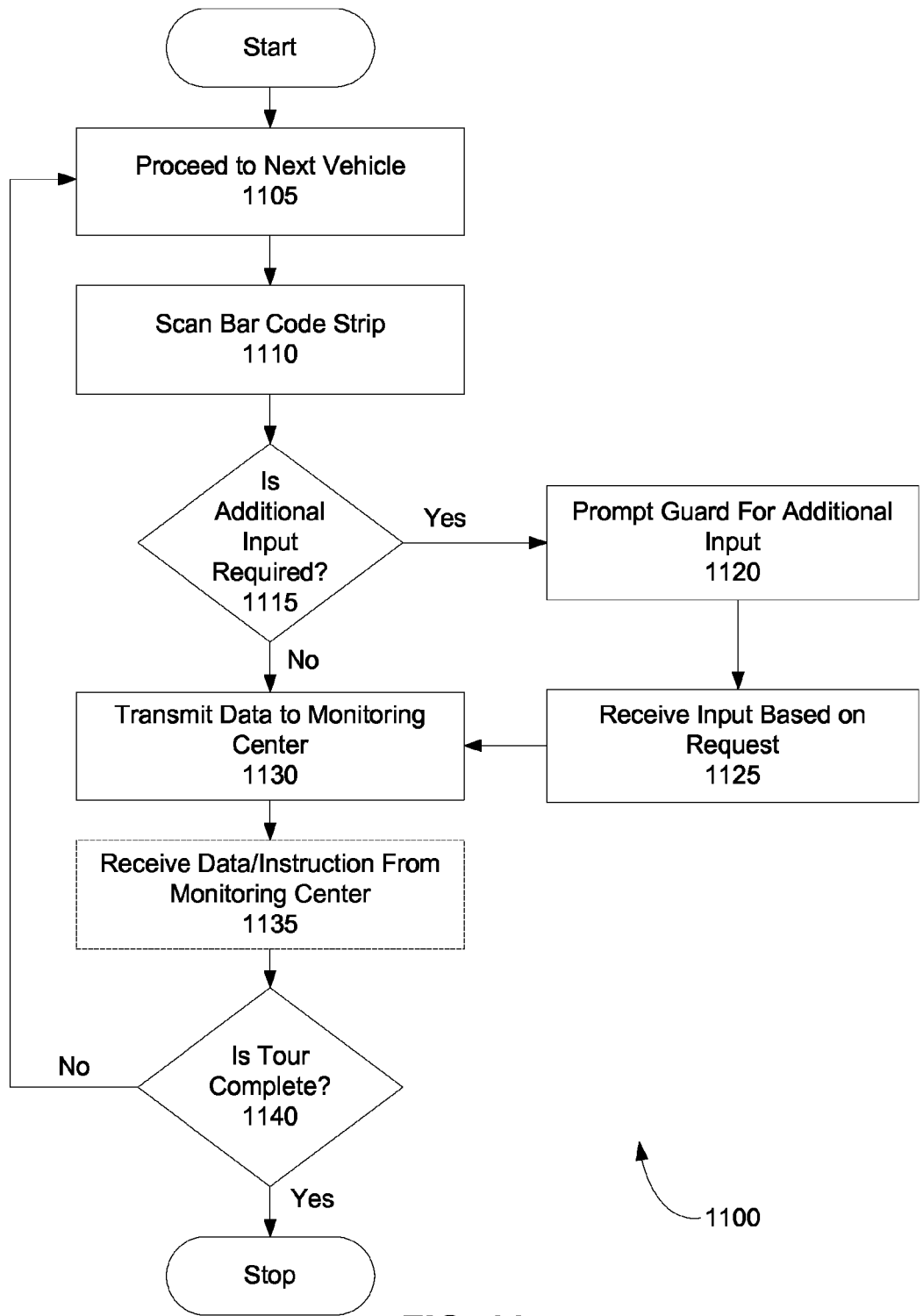

FIG. 11 is one example flowchart of an operation of a communicator utilized in conjunction with a yard audit system, according to an illustrative embodiment of the invention.

Figure 12:
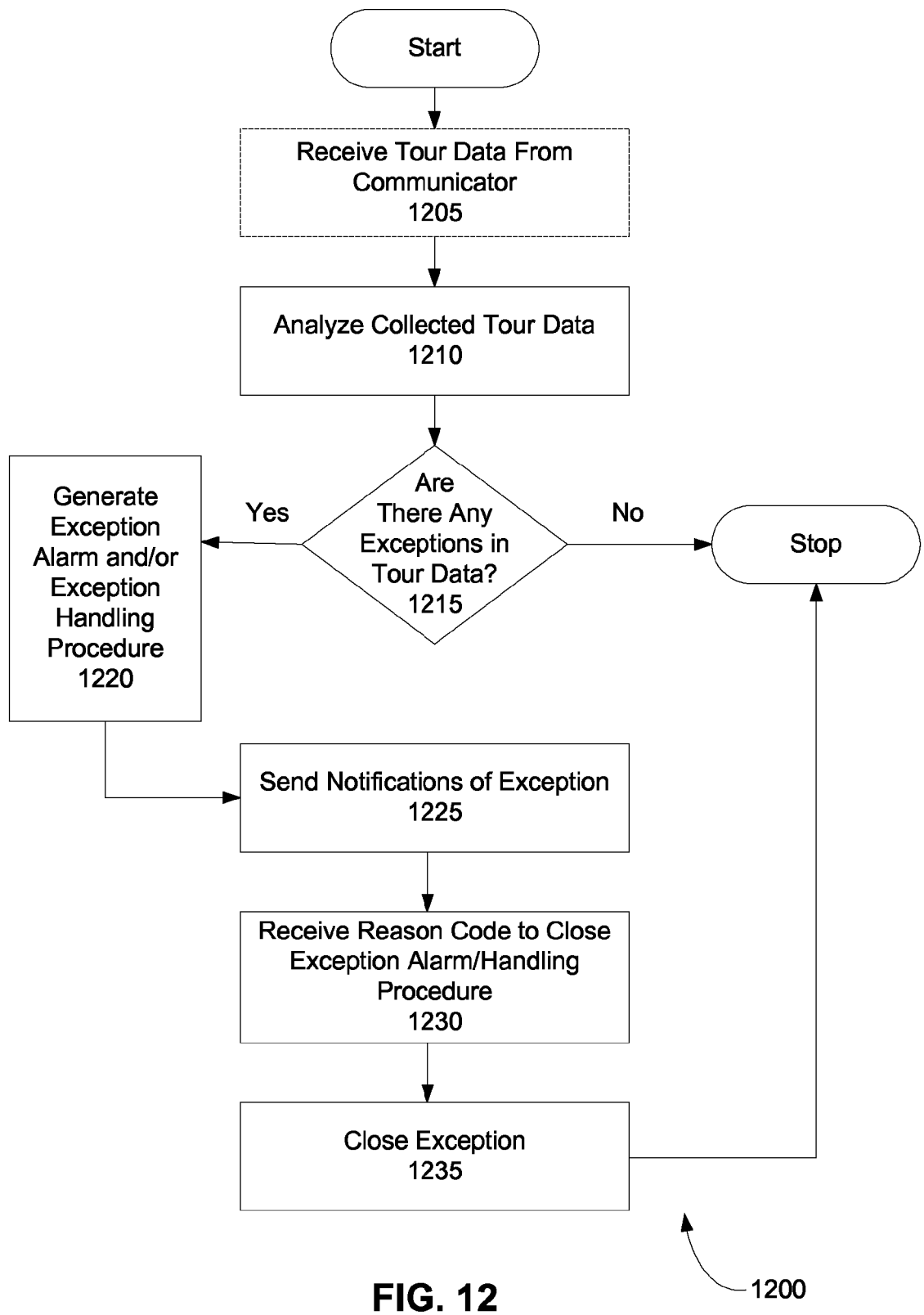

FIG. 12 is one example flowchart depicting a method for processing data collected during a vehicle yard tour to determine if any exceptions exist, according to an illustrative embodiment of the invention.

FIG. 13 is one example message that may be communicated when an exception is identified by a yard audit system, according to an illustrative embodiment of the invention.

DETAILED DESCRIPTION

Example embodiments of the invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the term "communicator" refers to any suitable or appropriate device that facilitates the electronic collection of data associated with a vehicle, a driver of the vehicle, a bill of lading associated with the vehicle, and/or a location of the vehicle in a vehicle yard.

In accordance with example embodiments of the invention, systems, methods and apparatus for monitoring and actuating a vehicle gate, such as a gate at a commercial or industrial site, are provided. A guard, other individual, or other group of individuals monitoring a gate may utilize a suitable data input device, such as a suitable communicator, to gather or collect data associated with a vehicle. The communicator may permit the guard to gather a wide variety of data including, but not limited to, data associated with the status of the vehicle, data associated with the condition of the vehicle, data associated with a bill of lading that is associated with the vehicle, data associated with the driver's license of the vehicle's driver, and/or other data associated with the vehicle's driver. The gathered data may be transmitted or otherwise communicated by the communicator to a processing station. The processing station may receive the data and analyze the received data in order to identify any exceptions in the data. Based on the analysis performed by the processing station, the processing station may cause a gate actuator to open the gate and permit the vehicle to enter or exit the site.

In accordance with other embodiments of the invention, systems, methods, and apparatuses for monitoring a vehicle yard, such as a vehicle yard at a commercial or industrial site, are provided. A guard may utilize a communicator during a guard tour to gather or collect data associated with the vehicles located at or present at the vehicle yard. The gathered data may be transmitted and/or otherwise communicated by the communicator to a data collection and monitoring center or a processing station. The gathered data may be communicated to the data collection and monitoring center in real time, in approximate real time, or close to real time during the guard tour. Accordingly, in certain embodiments of the invention, the gathered data may be communicated to the data collection and monitoring center prior to the completion of the guard tour. The data collection and monitoring center may analyze the received data in order to identify exceptions, for example, a missing vehicle exception. If an exception is identified, the data collection and monitoring center may transmit or otherwise communicate information and/or instructions associated with the identified exception to the guard, the guard's supervisor, a manager of the data collection and monitoring center, a maintenance supervisor, a client and/or one or more other individuals or entities associated with the guard tour.

A gate monitoring and actuating system and/or a yard audit system in accordance with various embodiments of the invention may be utilized at any appropriate location, including appropriate commercial or industrial installations such as, a truck yard, a port facility, a distribution center, or a manufacturing plant.

FIG. 1 is a schematic diagram of one example gate monitoring and actuating system 100, according to an illustrative embodiment of the invention. The gate monitoring and actuating system 100 will be referred to herein as a gate monitoring system. The gate monitoring system 100 may include a communicator 105, a processing station 110, and a gate actuator 115. The gate monitoring system 100 may be utilized to monitor and/or control the operation of a gate 120, such as, a gate leading to a commercial or industrial site. The communicator 105 may be utilized by a guard or other individual(s) to gather or collect data associated with a vehicle 125. A wide variety of data may be collected as desired by a user or the communicator 105, as discussed in greater detail below with reference to FIGS. 2 and 5. Once data is collected the communicator 105 for the vehicle 125, the data may be transmitted or otherwise communicated to the processing station 110. The data may be communicated to the processing station 110 via any suitable communications device and/or communications system, for example, via a network 130. In certain embodiments of the invention, the data may be communicated to the processing station 110 after all of the data for a vehicle is collected by the guard. Alternatively, in other embodiments, the data may be communicated to the processing station 110 in real time, in approximate real time, or at a time that is proximately close to the time at which the data was collected. In other words, the communicator 105 may transmit data to the processing station 110 after one or more items of data are collected even if all of the data for the vehicle has not been collected. In one embodiment, the communicator 105 may transmit data to the processing station 110 as each item of data is collected or as groups of data are collected. In another embodiment, the communicator 105 may periodically transmit data to the processing station 110 while a vehicle is being examined by a guard, for example, every five seconds. In various embodiments, data may be transmitted or otherwise communicated to the processing station 110 either automatically or upon a manual entry or selection of a communication command by the guard.

The communicator 105 may be any processor-driven device, such as a handheld computer, minicomputer, programmable device, and the like. In addition to having a processor 140, the communicator 105 may further include a memory 142, input/output ("I/O") interface(s) 144 and a network interface 146. The memory 142 may store data files 148 and various program modules, such as an operating system ("OS") 150 and a communications module 152. The communications module 152 may be a software program operable to manage interactions and/or communications with the processing station 110. For example, a guard or other user may utilize the communicator 105 to input data about a vehicle, and the communications module 152 may facilitate the communication of at least a portion of the inputted data to the processing station 110.

Still referring to the communicator 105, the I/O interface(s) 144 may facilitate communication between the processor 140 and various I/O devices associated with the communicator 105, such as a keypad, touch screen, camera, scanner, RFID reader, and the like. The network interface 146 may take any of a number of forms, such as a network interface card, a modem, a wireless network card, a cellular network card, and the like. One example of a communicator that may be utilized is described in greater detail below with reference to FIG. 2.

Similarly, the processing station 110 may be any processor-driven device, such as a personal computer, laptop computer, handheld computer, and the like, that is configured for receiving data from the communicator 105 and determining whether to open or otherwise actuate a gate 120 based at least in part on the received data. The processing station 110 may include a processor 154, a memory 156, input/output ("I/O")

interface(s) 158, and a network interface 160. The memory 156 may store data files 162 and various program modules, such as an operating system ("OS") 164, a database management system ("DBMS") 166, and a communications module 168. The communications module 168 receives data from the communicator 105 and processes at least a portion of the received data in order to determine whether to open or otherwise actuate the gate 120 and allow a vehicle to pass. Additionally, in certain embodiments of the invention, the processing station 110 may communicate with one or more data sources 175 via the network 130 in order to receive additional data that may be utilized in a determination on whether or not to open the gate 120. Data received from the communicator 105 and/or from one or more data sources 170 may be stored in one or more suitable memory devices associated with the communications module 168, such as, database 190. One may appreciate that the processing station 110 may include alternate and/or additional components, hardware or software. For example, the processing station 110 may include one or more user interface device(s), for example, a keyboard, mouse, control panel, microphone, etc., that facilitate user interaction with the processing station 110.

The data source(s) 170 may include any number of processor-driven devices that are configured to communicate additional data to the processing station 110 that may be utilized in a determination of whether to open or otherwise actuate the gate 120. In one embodiment of the invention, each of the data sources 170 may receive requests for additional information from the processing station 110, and each of the data sources 170 may communicate the additional data to the processing station 110 in response to the received request. Additionally, in various embodiments of the invention, additional data may be communicated to the processing station 110 from one or more of the data sources 170 without the data being requested. For example, additional data may be communicated as it is acquired by an additional data source or at predetermined time intervals, such as, once a day or once an hour. As another example, additional data may be communicated to the processing station 110 via a batch process.

A wide variety of different types of additional data may be communicated to the processing station 110 (or other processing entity) by an additional data source as desired in various embodiments of the invention. Examples of additional data include, but are not limited to, expected data for vehicles (e.g., tag number, tractor number, trailer number, etc.), expected data for drivers (e.g., driver's license number, name, etc.), expected data associated with a bill of lading for a vehicle, and/or expected or planned arrival and departure times for a vehicle. For example, in one embodiment, information associated with planned arrival and departure times for vehicles may be received from an appropriate logistics and traffic management system of a carrier, a transportation company, and/or from a client associated with the commercial or industrial site.

Each of the data sources 170 may include a processor 172, a memory 174, input/output ("I/O") interface(s) 176, and a network interface 178. The memory 174 may store data files 180 and various program modules, such as an operating system ("OS") 182, a DBMS 184, and a communications module 186. The communications module 186 may communicate additional data to the processing station 110 that may be utilized in a determination of whether to open or actuate the gate 120. The additional data may be communicated to the processing station 110 in response to a request for the additional data or in the absence of a request for the additional data. Each of the data sources 170 may include or be associated with any number of suitable memory devices configured to store the additional data and/or any data that may be received from the communicator 105 or processing station 110, such as, memory 174 and/or database 188.

Additionally, in some embodiments, one or more of the data sources 170 may make the determination of whether to open or actuate the gate 120. In this situation, the one or more data sources 170 may receive data from the processing station 110 and/or the communicator 105 and may utilize at least a portion of the data in a determination of whether to open or actuate the gate 120. The one or more data sources 170 may then either communicate the decision to the processing station 110 or, alternatively, may directly control the opening or actuation of the gate 120 via communication with the gate actuator 115.

A wide variety of different entities may function as a data source 170, such as, a central processing system associated with a facility where the gate monitoring system 100 is utilized, a central processing system associated with a security company that monitors the gate 120 and/or the facility, or the data collection and monitoring center 810 described in greater detail below with reference to FIG. 8. Additionally, a wide variety of additional data may be communicated to the processing station 110 by an additional data source 170 as desired in various embodiments of the invention. Examples of additional data include, but are not limited to, expected data for one or more bill of ladings, data associated with driver's not permitted on the premises, or any other data that may be utilized in a determination of whether to open or actuate the gate 120.

In addition to collecting data associated with the vehicle by utilizing the communicator 105, in various embodiments of the invention, one or more other data collection devices may be utilized as desired. For example, one or more cameras, such as camera 118, may be utilized to take pictures and/or video recordings of a vehicle 125 as it approaches the gate 120 and/or as it drives away from the gate 120. These pictures and/or video recordings may be communicated to the communicator 105, the processing station 110 and/or to one or more external devices or systems by any suitable connections, for example, via network 130. The camera 118 may be any suitable camera as desired in various embodiments of the invention, such as, a closed-circuit television (CCTV) camera or other surveillance camera.

The network 130 may be any appropriate network utilized to transmit data between components of the gate monitoring system 100, such as between the communicator 105 and the processing station 110. According to an aspect of the invention, the network 130 may be a wireless network. However, other types of networks may be utilized as desired in various embodiments of the invention, such as, a radio network, a cellular network, a wired network connection, a LONWORKS network, any appropriate local area network, any appropriate wide area network (e.g., the Internet), etc. Additionally, in certain embodiments of the invention, multiple networks may be utilized as desired. For example, the communicator 105 and the processing station 110 may communicate via a wireless local area network and the processing station 110 and a data source 170 may communicate via a wide area network (e.g., the Internet). Other examples of utilizing multiple networks can be used in accordance with various embodiments of the invention.

The processing station 110 may store data received from the communicator 105, from other data collection devices, such as camera 118, and/or from one or more data sources 170 in one or more suitable memory devices, such as memory 156 or database 190. The data received by the processing station 110 from the communicator 105 may include data associated with the communicator 105 and/or data associated with the vehicle. Data associated with the communicator 105 may include an identification number of the communicator 105, identification information for the guard that is utilizing the communicator 105 (e.g., the name of the guard, an operating number of the guard, biometric information associated with the guard) and/or a current location of the communicator. In certain embodiments, the current location of the communicator may be a global positioning system (GPS) coordinate for the communicator 105. In other embodiments, the current location may be a location derived from a cellular network for the communicator 105. The data associated with the vehicle may include many different types of information, as explained in greater detail below with reference to FIGS. 2 and 5.

Once the data has been received by the processing station 110 from the communicator 105, the processing station 110 may analyze the data in order to identify one or more exceptions associated with the collected data. In certain embodiments of the invention, data received from one or more data sources 170 may also be utilized in the analysis of the data received from the communicator 105 in order to identify one or more exceptions. Many different types of exceptions may be identified by the processing station 110 as desired in various embodiments of the invention, for example, exceptions associated with the communicator 105, exceptions associated with a bill of lading associated with the vehicle 125, and/or exceptions associated with a driver of the vehicle 125. Examples of exceptions associated with the communicator 105 may include exceptions for an unauthorized operator of the communicator 105 and exceptions for the communicator 105 not being in close proximity to the gate 120, also referred to as an out of range exception. As an example of an unauthorized operator exception, an exception may be identified if a guard or other person operating the communicator 105 fails to enter a valid user ID or operating number into the communicator 105. As another example of an unauthorized operator exception, an exception may be identified if biometric data (e.g., digital fingerprint, digital signature, digital retinal scan, etc.) input into the communicator 105 by a guard or other person operating the communicator 105 fails to identify a valid user of the communicator 105. As an alternative to determining whether an unauthorized operator exception has occurred, the communicator 105 may be configured to prevent an operator from gathering and/or communicating data associated with a vehicle 120 to the processing station 110 until a valid user ID, operating number, or biometric data validation is entered into or otherwise received by the communicator 105.

As an example of an out of range exception, an exception may be identified if the communicator 105 is not in close proximity to the gate 120 at the time that data associated with a vehicle 125 is gathered and/or at the time that data associated with a vehicle 125 is communicated to the processing station 110. It will be understood that a current position of the communicator 105 may be determined by an appropriate component of the communicator 105, for example, a global positioning system or a cellular network location system. The current position of the communicator 105 may be stored in the communicator in association with gathered data and/or the current position of the communicator 105 may be transmitted to the processing station 110 in association with gathered data. As an example, an out of range exception may be identified if a guard is attempting to collect data associated with a vehicle 125 that is not in close proximity to the gate 120, such as, a vehicle 125 that is not the first vehicle in a queue lined up at the gate 120. Accordingly, the gate monitoring system 100 may prevent or avoid a situation in which the gate 120 is opened or actuated for a first vehicle and a second vehicle (e.g., such as a vehicle that is closer to the gate 120 in a queue) is capable of passing through the gate 120.

Example exceptions associated with a bill of lading may include exceptions identified by an error with the bill of lading number, an error with the seal number, an error with the trailer number, an error with the standard carrier alpha code (SCAC), an error with the carrier, and an error with a tractor or cab number. Exceptions associated with a bill of lading may be identified if discrepancies are found between data recorded on or associated with a bill of lading and expected data values or other data values gathered by the communicator 105. In certain embodiments of the invention, expected data values for a bill of lading may be received from one or more data sources, such as data source 170, via a network 130. A an example of a bill of lading exception, an exception may be identified if a trailer number associated with a bill of lading does not match the actual trailer number of a tractor trailer at the gate 125. As another example, an exception may be identified if a bill of lading number associated with the bill of lading is not including in a list of expected bill of lading numbers. In other words, a bill of lading number may be associated with a shipment of goods that was not supposed to be delivered to a commercial or industrial site to which access is controlled by the gate 125.

An example bill of lading number exception is discussed above and may include a situation in which a bill of lading number does not match an expected bill of lading number. An example seal number bill of lading exception may be an exception identified if a discrepancy is found between a seal number associated with the bill of lading and a seal number associated with a seal on the trailer. Similarly, an example trailer number bill of lading exception may be an exception identified if a discrepancy is found between a trailer number associated with the bill of lading and a trailer number associated with the trailer at the gate 120. An example cab number bill of lading exception may be an exception identified if a discrepancy is found between a tractor or cab number associated with the bill of lading and a tractor or cab number associated with the tractor or cab at the gate 120. An example carrier bill of lading exception may be an exception identified if a discrepancy is found between a company or carrier number associated with the bill of lading and a company or carrier number associated with the tractor or driver. In certain embodiments, the gate monitoring system 100 may also identify an exception if a carrier number associated with the bill of lading or a carrier number associated with the tractor or driver identifies a carrier that is not permitted on the commercial or industrial site. An example SCAC bill of lading exception may be an exception identified if a discrepancy is found between the carrier identified by the SCAC associated with the bill of lading and the carrier associated with the tractor and/or trailer at the gate 120. Additionally, in certain embodiments, the gate monitoring system 100 may identify an exception if a SCAC associated with the bill of lading identifies a carrier that is not permitted on the commercial or industrial site. Other exceptions associated with the bill of lading may be identified by the gate monitoring system 100 as desired in various embodiments of the invention.

Data from a bill of lading may be manually entered into the communicator 105 by the guard utilizing one or more appropriate input devices or, alternatively, the data may be automatically collected or read in by the communicator 105 utilizing one or more appropriate input devices. These various input devices are explained in greater detail below with reference to FIG. 2. For example, the communicator 105 may include a scanning device that scans a bill of lading. The scanned bill of lading information may then be parsed out into appropriate data fields by the communicator 105 and/or communicated to the processing station 110 for processing. Additionally, in some embodiments, the parsing of the scanned bill of lading information may be conducted by the processing station 110. As another example, the communicator 105 may be utilized to collect bill of lading data from an electronic data source associated with the vehicle 125. For example, the vehicle or the driver of the vehicle may include a digital processing device and/or a digital data storage device (e.g., a smart card, a memory stick, a diskette, a CD-ROM, a personal digital assistant, a personal computer, etc.). The data may be communicated from the device associated with the vehicle or driver to the communicator 105 by any suitable device(s) or system(s), for example, an established wired or wireless network connection or by the device being inserted into an appropriate drive or port incorporated into the communicator 105.

Example exceptions associated with a driver of the vehicle 125 may include exceptions identifying an expired driver's license, exceptions identifying a driver not licensed to drive the vehicle 125, exceptions identifying a driver that is not allowed at the commercial or industrial site, and/or exceptions associated with a transportation worker identification credential card (TWIC) of the driver. An example expired driver's license exception may be an exception that is identified if an expiration date associated with the driver's license occurred prior to the present date. An example driver not licensed to drive the vehicle exception may be an exception identified if a driver's license class associated with the driver's license does not permit the driver to operate the vehicle 125. For example, the driver may have a class C driver's license issued by a particular state, and the class C driver's license may not permit the driver to operate a tractor trailer. An example driver not allowed exception may be identified if the name associated with the driver's license identifies a driver that is not allowed at the commercial or industrial site. For example, the name of the driver may be compared to a list of driver's names that are not permitted at the site, and an exception may be identified if a correspondence is found. Other driver's license exceptions may be identified by the gate monitoring system 100 as desired in various embodiments of the invention.

In certain commercial or industrial sites, such as, at a port facility or other maritime facility, the identity of an individual desiring to enter or exit the facility may be verified by a transportation worker identification credential (TWIC) card. The issuance of these cards is currently controlled by the Transportation Security Administration (TSA) and/or by the U.S. Coast Guard. A TWIC card is a tamper-resistant biometric credential that is intended to provide maritime workers with unescorted access to secure areas of port facilities. Information associated with any TWIC cards issued to a driver of a vehicle 125 may be collected (e.g., manual collection, scanning, etc.) and checked for exceptions. Examples of TWIC exceptions include the lack of required TWIC information exceptions, expired TWIC information exceptions, unauthorized access exceptions, driver not allowed exceptions, etc. A lack of required TWIC information exception may be identified if a driver or other individual in the vehicle 120 does not have TWIC information when such information is required for access to a facility. An expired TWIC information exception may be identified if the TWIC information is not current. A driver (or other individual) not allowed exception may be identified if the name associated with the TWIC card identifies an individual that is not allowed at the commercial or industrial site. An unauthorized access exception may be identified if an access level associated with the TWIC information does not satisfy access requirements for the site. Other TWIC exceptions may be identified by the gate monitoring system 100 as desired in various embodiments of the invention.

According to an aspect of the invention, the data associated with a driver and/or the license of the driver may be gathered or collected by the communicator 105 with an appropriate data collection device that is incorporated into the communicator 105, for example, a barcode scanner. In other words, a barcode scanner included or incorporated into the communicator 105 may be utilized to scan a barcode present on the driver's license of the vehicle's driver. However, in certain embodiments of the invention, the data may be gathered by the communicator 105 by other methods or devices, for example, by the guard manually inputting the data, by the data being read in from a smart card or other data storage device carried by the driver or present in the vehicle 125, or by data conveyed by a RFID or wireless communication device associated with a driver or vehicle.

In certain embodiments of the invention, the processing station 110 may determine whether the gate 120 may be opened or actuated to allow the vehicle 125 to pass. The determination may be based at least in part on the examination of the data received from the communicator 105. In some embodiments, the examination of the data received from the communicator 105 may include comparing at least a portion of the data received from the communicator 105 to at least a portion of data received from one or more data sources 170. As an example of a determination, the processing station 110 may determine that the gate 120 may be opened or actuated if no exceptions are identified in the data received from the communicator 105. As another example, the processing station 110 may determine that the gate 120 may be opened or actuated if one or more exceptions of a predetermined type are not identified. In other words, in certain embodiments, the gate 120 may still be opened or actuated if certain types of exceptions are identified. If the processing station 110 determines that the gate 120 may be opened or actuated, then the processing station 110 may communicate or transmit an appropriate signal to open or actuate the gate 120 to the gate actuator 115. The gate actuator 115 may receive the signal and open or actuate the gate 120, thereby allowing the vehicle 125 to pass. After the vehicle 125 has passed through the gate 120, the gate actuator 115 may cause the gate 120 to close. Many different methods or components may be incorporated as desired into the gate monitoring system 100 in order to determine when the gate 120 will close behind the vehicle 125. For example, the gate monitoring system 100 may incorporate one or more sensors to determine when the vehicle 125 has passed through the gate 120. As another example, the gate actuator 115 may include or be in communication with a timer, and the gate actuator 115 may close the gate 120 after a predetermined period of time has passed after the gate 120 is opened, for example, after fifteen seconds.

The gate actuator 115 may include any electronic device or devices that are configured to open, actuate, and close the gate 120. The gate actuator 115 may include a network interface 117, input/output ("I/O") interface(s) 118, and an actuation module 119. The actuation module may control the actuation of the gate based at least in part on instructions received via the network interface 117 and/or the I/O interfaces 118. The actuation module may include any suitable circuitry and/or devices for controlling the actuation of the gate, for example, an application specific circuit, a microcontroller, a controller, a minicomputer, or any processor driven device.

The gate actuator 115 may be in communication with the processing station 110, the communicator 105, and or one or more data sources 170 via any appropriate communications link, for example, via a network 130. The network 130 may be any appropriate network utilized to transmit data between the processing station 110, communicator 105, or one or more data sources 110 and the gate actuator 115. For example, a wireless network may be utilized to transmit data and/or instructions between the gate actuator 115 and another component of the gate monitoring system 100. As another example, a wired network connection may be established between the gate actuator 115 and the processing station 110. Other types of networks may be utilized as desired in accordance with various embodiments of the invention in order to facilitate communication between the gate actuator 115 and one/or more other components of the gate monitoring system 100 such as, a radio network or a cellular network.

According to an aspect of the invention, the gate 120 may be manually opened or actuated by the guard or another individual. For example, the guard may input or select a command to manually open the gate 120. The guard may enter or select the command at either the communicator 105 and/or at the processing station 110. As another example, the communicator 105, the processing station 110, and/or the gate actuator 115 may be in communication with a data collection and monitoring system, such as the data collection and monitoring center 810 discussed below with reference to FIG. 8. The data collection and monitoring center 810, which may be one of the data sources 170 in certain embodiments, may be remotely located to the gate monitoring system 100, and a command to manually open the gate 120 may be received from the data collection and monitoring center 810. The communicator 105, the processing station 110, and/or the data collection and monitoring center 810 may store an indication of each instance in which the gate 120 was manually opened. Additionally, information associated with the vehicle 125 allowed to pass through the gate 120 may be stored in association with a stored indication of a manual opening.

According to another aspect of the invention, the communicator 105, the processing station 110, and/or the data collection and monitoring center 810 may provide functionality for the gate 120 to be manually opened in an emergency situation. For example, the communicator 105 may include a button or a menu option that allows a guard at the gate 120 to manually open the gate in an emergency situation, for example, when an emergency vehicle (e.g., an ambulance) or a police vehicle seeks access to or from the commercial or industrial site via the gate 120. The communicator 105, the processing station 110, and/or the data collection and monitoring center 810 may store an indication of each instance in which the gate 120 was manually opened for an emergency situation. Additionally, information associated with the vehicle 125 allowed to pass through the gate 120 may be stored in association with a stored indication of a manual opening.

Additionally, as desired in various embodiments of the invention, the communicator 105, the processing station 110, and/or the data collection and monitoring center 810 may store an indication of each instance in which the gate 120 is automatically opened. One or more counters such as, digital counters stored in a register within an electronic memory, may also be utilized to keep track of the number of times that the gate is opened. In one embodiment, separate counters may be utilized to track manual gate openings, emergency gate openings, automatic gate openings, and total gate openings. Other types of counters may be utilized as desired in various embodiments of the invention. The various counters may be utilized as a checksum to ensure that a guard does not discover or find an alternative method for opening the gate 120. For example, if the total number of recorded manual openings, emergency openings, and automatic openings does not equal the total number of gate openings, then an exception may be identified. This exception might indicate that a guard has discovered an alternative method for opening the gate 120 and appropriate corrective action may be taken.

According to another aspect of the invention, the communicator 105, the processing station 110, and or one or more data sources 170 (e.g., the data collection and monitoring center 810) may store the gathered data associated with a vehicle 125. The gathered data may be communicated between components of the gate monitoring system 100 as desired and stored at memories associated with the various components as desired. The stored data may be utilized to generate a variety of reports, for example, those discussed below with reference to FIGS. 7A-7D. The gathered data may be stored in any suitable electronic storage device, such as memories and/or databases associated with the various components of the gate monitoring system 100. For example, the gathered data may be stored in a memory or database associated with the communicator 105 and/or the processing station 110.

As an example of communicating data between various components of the gate monitoring system 100, the communicator 105 and/or the processing station 110 may communicate or transmit the gathered data to a network component or device that is remotely located to the gate monitoring system 100. For example, the communicator 105 may transmit the gathered data to a data collection and monitoring system 100 via a cellular network. As another example, the processing station 110 may transmit the gathered data to a data collection and monitoring center via a wide area network, for example, the Internet. It will be appreciated that many different types of network connections may exist between one or more components of the gate monitoring system 100 and one or more network components or devices that are remotely located to the gate monitoring system 100.

The use of the gate monitoring system 100 may decrease the time that it takes for a guard to examine a vehicle 125 at the gate 120, thereby functioning to decrease the wait time for a vehicle 125 at the gate 120. The communicator 105 may decrease the time that it takes for a guard to gather necessary data associated with the vehicle 125. Accordingly, during peak periods of traffic at the commercial or industrial site, the use of the gate monitoring system 100 may decrease the length of a queue that forms at the gate 120.

FIG. 2 is a block diagram of one example communicator 200 that may be utilized in accordance with a gate monitoring system, such as gate monitoring system 100 shown in FIG. 1. For example, the communicator 200 may be utilized as the communicator 105 shown in FIG. 1. The communicator 200 may be any appropriate device that is configured to collect or gather data at or near a vehicle, such as vehicle 125, and communicate the gathered data to a processing station, such as processing station 110. For example, the communicator 200 may be a Model 9090-G device, as manufactured by Symbol Technologies Inc. The communicator 200 may include a communicator control unit 205 and a memory 210. The communicator control unit 205 may control the operation of the communicator 105. The communicator control unit 205 may include any appropriate processing device or combination of processing devices, such as a microcontroller, a minicomputer, an EPROM, or a processor. Further, the communicator control unit 205 may include software, hardware, firmware or any combination thereof. The memory 210 may be in communication with the communicator control unit 205, and the memory 210 may be operable to store data gathered by the communicator 105 and/or programmed logic that is executable by the communicator control unit 205, such as an operating system, a communications module, etc. The memory 210 may include any suitable electronic storage device or combination of devices, such as, a random access memory (RAM), a flash memory, or a magnetic data storage device.

The communicator control unit 205 may also incorporate or be in communication with one or more input/output (I/O) interfaces 215 and/or one or more network interface 250. In one embodiment, the communicator control unit 205 may be in communication with the network interface(s) via the one or more I/O interfaces 215. The one or more I/O interfaces 215 may facilitate communication between the communicator control unit 205 and other components of the communicator 200 or with external devices. The one or more I/O interfaces 215 may facilitate communication between the communicator control unit 205 and components of the communicator 200 that are operable to gather or collect data associated with a vehicle 125.

According to an aspect of the invention, the communicator 200 may include one or more data collection devices that may be in communication with the communicator control unit 205 via the one or more I/O interfaces 215. With reference to FIG. 2, the communicator 200 may include or incorporate one or more scanners 220, one or more cameras 225, one or more keypads 230, and one or more touch screens 235. Other data collection devices may be incorporated into the communicator 200 or in communication with the communicator 105, such as, data ports, disk drives, network access points, touchpads, selectable displays, microphones, and/or voice recognition programs or software.

The one or more scanners 220 may be operable to scan data and/or images associated with a vehicle 125. For example, the one or more scanners 220 may include a barcode scanner that is operable to scan a barcode situated on the driver's license of the vehicle's driver. The barcode scanner may also be operable to scan a barcode associated with each vehicle 125. As another example, the one or more scanners 220 may include an optical scanner that is operable to scan images associated with the vehicle 125 such as, the driver's license or a bill of lading. Although a barcode scanner and an optical scanner have been described herein as example scanning devices, many different types of scanning devices and/or scanning techniques may be incorporated into or in communication with the communicator 200 including, but not limited to, RFID scanners or readers, camera scanners, etc. For example, certain embodiments of the communicator 200 may utilize a camera 225 to scan a smart label or a barcode that is designed to be scanned by the camera 225.

In certain embodiments of the invention, the scanners 220 may include one or more suitable scanners for receiving biometric data associated with a guard or other user of the communicator 220. For example, the scanners 220 may include a digital fingerprint scanner and or a digital retinal scanner. Other types of biometric data scanners may be utilized in other embodiments of the invention as desired. In this regard, a guard or other user of the communicator 200 may be identified and or validated as an authorized user based at least in part on biometric data.

Each of the one or more cameras 225 may be any suitable device that is operable to record a digital image and/or a digital video. The one or more cameras 225 may be utilized to record images and/or videos associated with the vehicle 125. For example, the one or more cameras 225 may be utilized to record one or more images of the vehicle 125, the driver of the vehicle 125, the items transported by the vehicle 125, and/or associated documentation. As one example, if the guard identifies a problem associated with the vehicle 125 such as, physical damage to the trailer, the guard may utilize the one or more cameras 225 to record an image of the identified damage. As another example, the guard may utilize the one or more cameras 225 to record an image of one or more license tags or plates associated with the vehicle 125 (e.g., a license plate associated with the tractor and/or a license plate associated with the trailer). As yet another example, the guard may utilize the one or more cameras 225 to record an image of the driver of the vehicle 125. The types of images described above are merely examples of types of images that may be recorded by the one or more cameras 225. Many different types of images associated with the vehicle 125 may be recorded by the one or more cameras 225 as desired in various embodiments of the invention.

According to an aspect of the invention, the guard may manually input data into the communicator 200 via the one or more keypads 230, the one or more touch screens 235 and/or other suitable input devices. The one or more keypads 230 may include a standard 53 key keyboard that facilitates rapid alphanumeric data input. Additionally or alternatively, the one or more keypads 230 may include a standard telephone keypad that facilitates manual input from the guard. The one or more touch screens 235 may facilitate data selection and or input into the communicator 200 via a selectable display, as will be understood by those skilled in the art.

According to another aspect of the invention, the communicator 200 may include at least one video driver 240 and at least one display 245. The communicator control unit 205 may be operable to communicate data to a video driver 240, and the video driver 240 may be operable to drive an output to a display 245. A display 245 may be operable to present data to the guard that is utilizing the communicator 200. The display 245 may be any type of suitable display such as, a liquid crystal display (LCD). The display 245 may be operable to display instructions to the guard, including instructions that are associated with the examination of the vehicle 125. Additionally, the display 245 may be operable to display instructions to the guard that are received from the processing station 110 and/or a device or system in communication with the gate monitoring system 100, for example, the data collection and monitoring center 810 discussed below with reference to FIG. 8. The display 245 may also be operable to display menu options to a guard that are utilized during the completion of a vehicle examination. For example, the display 245 may present a list of carriers associated with the vehicle 125 to the guard, and the guard may select the appropriate carrier from the presented list. The display 245 may also be operable to display to the guard information or data that has been entered into the communicator 200 by the guard. For example, the display 245 may be operable to present text that has been entered by the guard. As another example, the display 245 may be operable to present a picture that has been taken with the camera 225 to the guard.

With continued reference to FIG. 2, the communicator 200 may also include one or more network interfaces 250 that are in communication with the communicator control unit 205. Each of the one or more network interfaces 250 may be a suitable interface that facilitates communication between the communicator 200 and other components of a gate monitoring system, such as system 100, and/or other external devices and systems. Many different types of network interfaces may be incorporated into the communicator 200 as desired in various embodiments of the invention. For example, the one or more network interfaces 250 may include a wireless modem that facilitates network communication with the processing station 110 via a network, such as network 130. As another example, the one or more network interfaces 250 may include a cellular network interface that facilitates communication via a cellular network.

FIG. 3 is one example flowchart of the operation of a gate monitoring system, such as gate monitoring system 100, according to an illustrative embodiment of the invention. FIG. 3 illustrates one example method 300 for processing a vehicle that arrives at a gate of a gate monitoring system 100.

The method 300 may begin at block 305 when a vehicle, such as vehicle 125, arrives at or reaches a gate, such as gate 120. At block 305, various data associated with the vehicle 125 may be gathered. A wide variety of data associated with the vehicle, the vehicle's driver, etc. may be gathered as desired in various embodiments of the invention, including but not limited to, the various types of data discussed above with reference to FIG. 1. The data may be gathered by the guard utilizing a suitable communicator, such as communicator 105.

Following the gathering of some or all of the data at block 305, operations may proceed to block 310 and the data may be processed. The data may be processed by the communicator 105, by a processing station, such as processing station 110, and/or by an external device or system in communication with the gate monitoring system 100. Data may be communicated by the communicator 105 to other components of the gate monitoring system 100 as desired in various embodiments of the invention. During the processing of the data, exceptions may be identified in the data, as discussed in greater detail below with reference to FIG. 6. Once at least a portion of the gathered data associated with the vehicle 125 has been processed at block 310, operations may proceed to block 315. At block 315, a determination may be made as to whether the gate 120 may be automatically opened. If it is determined at block 315 that the gate 120 may be automatically opened, then operations may proceed to block 320. At block 320, the gate 120 may be automatically opened by a gate actuator, such as gate actuator 115 shown in FIG. 1, thereby allowing the vehicle 125 to pass through the gate 120. If, however, it is determined at block 315 that the gate 120 may not be automatically opened (i.e., exceptions are identified in the gathered data), then operations may proceed to block 325. At block 325, a determination may be made as to whether the gate 120 may be opened manually. For example, the guard or another individual may manually direct the gate monitoring system 100 to open the gate 120. At block 325, if it is determined that the gate may not be manually opened, then operations may stop and the method 300 may end. If, however, it is determined at block 325 that the gate may be manually opened, then operations may proceed to block 330. At block 330, the gate 120 may be manually opened by the gate actuator 120, thereby allowing the vehicle 125 to pass through the gate 120 and the method 300 may end.

The operations described in the method 300 of FIG. 3 do not necessarily have to be performed in the order set forth in FIG. 3, but instead may be performed in any suitable order. Additionally, in certain embodiments of the invention, more or less than all of the operations set forth in FIG. 3 may be performed.

FIG. 4 is one example flowchart of a method 400 for utilizing a communicator to gather data associated with a vehicle, according to an illustrative embodiment of the invention. For example, the method 400 may describe the operations of the communicator 105 illustrated in FIG. 1 to gather data associated with a vehicle, such as vehicle 125. The communicator 105 may be utilized to gather a variety of data associated with a vehicle 125 present at a gate, such as gate 120.

The method 400 may begin at block 405. At block 405, a guard or security officer utilizing the communicator 105 may enter an identification number and/or other identification information into the communicator 105. In certain embodiments, the guard may also be prompted to enter a password into the communicator 105 in order to verify the guard's identity. In other embodiments, the guard may enter biometric data, for example, a thumb scan, into the communicator 105 to facilitate verification of the guard. In certain embodiments of the invention, the guard's identity may be verified by the communicator 105; however, in other embodiments, the guard's identity may be verified by another component of a gate monitoring system 100, such as, processing station 110 shown in FIG. 1. Additionally, in certain embodiments, the guard may not be permitted to utilize the communicator 105 to collect vehicle data until the guard's identity has been verified.

At block 410, the guard may input vehicle status information into the communicator 105. Many different types of vehicle status information may be input into the communicator 105 as desired in various embodiments of the invention, for example, an indication as to whether the vehicle 125 is an inbound or outbound vehicle at the commercial or industrial site, the source of the vehicle or trailer (e.g., the origination city), the destination of the vehicle or trailer, vehicle class information, a trailer number, a tractor or cab number, a seal number, information associated with the transported cargo, one or more license plate number, a carrier identification, and/or a standard carrier alpha code (SCAC). At block 415, the guard may enter vehicle condition information. The vehicle condition information may include any information associated with the physical condition of the trailer and/or the cab. For example, the guard may enter information associated with the body condition of the trailer. Body condition information may be entered for different sections, sides, or panels of the trailer and/or the cab as desired. For example, condition information may be entered for the right side of the trailer, the left side of the trailer, the front of the trailer, and/or the back or door(s) of the trailer. In one embodiment, the guard may select a vehicle condition status from a predetermined list for each section of the trailer. Many different vehicle condition statuses may be available for selection by the guard, such as, no damage, one or more holes less than approximately six inches, and one or more holes greater than approximately six inches. Additionally, or alternatively, the guard may manually input a vehicle condition status for the section of the trailer or for the entire trailer. Condition information may be entered for the tractor in a similar manner to that entered for the trailer.

Additionally, in certain embodiments, the guard may enter vehicle condition information at block 415 based upon the vehicle status information. For example, if the vehicle 125 includes a refrigerated trailer, the guard may enter additional information associated with the refrigerated trailer, for example, the temperature of the refrigeration unit, the fuel level of a tank on the trailer that is used to power the refrigeration unit, and the status of the trailer doors (e.g., locked and sealed, opened with cargo in the trailer, or opened with an empty trailer). Many different types of additional vehicle condition information may be entered by the guard as desired in various embodiments of the invention. That described above for a refrigerated trailer is merely one example of additional vehicle condition information, and other types of information can be used as desired with various embodiments of the invention. Additionally, in some embodiments of the invention, the guard may enter the additional vehicle condition information in response to one or more prompts received by the communicator 105.

At block 420, the guard may enter bill of lading information into the communicator 105. The guard may manually enter bill of landing information and/or may automatically enter bill of lading information into the communicator 105 utilizing one or more suitable data collection devices associated with the communicator 105. The bill of lading information may be entered by one or more of manually typing information into the communicator 105, selecting information from predefined lists of options, downloading information associating with the bill of lading from one or more suitable data storage devices associated with the vehicle 125, and/or scanning a portion or all of the bill of lading. Many different types of information from the bill of lading may be entered into the communicator as desired in various embodiments of the invention, including but not limited to, a bill of lading number, a seal number, a trailer number, a tractor or cab number, a carrier, and/or a SCAC.

At block 425, the guard may utilize the communicator 105 to scan the driver's license of the vehicle's driver. According to an aspect of the invention, a barcode scanner incorporated into the communicator 105 may be utilized to scan a barcode situated on the driver's license. Many different types of information may be scanned from the driver's license as desired in various embodiments of the invention, such as, the name of the driver, the class of vehicle the driver is licensed to operate, and/or the expiration date of the driver's license. In other embodiments, the guard may manually enter information from the driver's license into the communicator 105, may utilize one or more other types of scanners to scan the driver's license, and/or may download information associated with the driver's license from one or more suitable data storage devices associated with the vehicle 125.

At block 430, the guard may utilize the communicator 105 to scan a barcode that is associated with the vehicle 125. According to an aspect of the invention, a unique barcode may be associated with the trailer of each vehicle 125 that enters the commercial or industrial site. An example barcode is discussed below with reference to FIG. 5. If a barcode is not present on the trailer, the guard may position or place a barcode on the trailer prior to the vehicle 125 entering the commercial or industrial site. The barcode may be utilized to identify the trailer while the trailer is present at the industrial or commercial site. In this regard, the trailer may be tracked while it is at the industrial or commercial site.

After a portion or all of the data associated with the vehicle 125 is collected by the communicator 105, the communicator 105 may transmit or communicate a portion or all of the collected data to one or more other components of a gate monitoring system 100, such as processing station 110. The communication of the collected data may occur at block 435, which may be optional in some embodiments of the invention. The collected data may be transmitted or otherwise communicated to the processing station 110 in real time, in approximate real time, or close to real time as each data item is collected by the communicator 105. Alternatively, the communicator 105 may transmit or otherwise communicate all of the data associated with a vehicle 125 to the processing station 110 following the collection of the data. For example, the data may be transmitted upon the selection or entering of a command by the guard following the collection of the data. In other embodiments, the data may be transmitted or otherwise communicated to the processing station 110 at predetermined time intervals during the examination of a vehicle 125 or following the entering of predetermined groups of data.

Although the collected data is described as being communicated to the processing station 110, in certain embodiments, of the invention, the collected data may be communicated to other components of the gate monitoring system 100 and/or to one or more external components. For example, the collected data may be communicated to a data collection and monitoring center, such as data collection and monitoring center 810 described below with reference to FIG. 8. As an alternative to communicating collected data to one or more other components of the gate monitoring system 100, in some embodiments, the communicator 105 may process the data itself and determine whether to open the gate 120.

The method 400 may end following block 435.

The operations described in the method 400 of FIG. 4 do not necessarily have to be performed in the order set forth in FIG. 4, but instead may be performed in any suitable order. Additionally, in certain embodiments of the invention, more or less than all of the operations set forth in FIG. 4 may be performed.

FIG. 5 is a depiction of one example barcode 500 that may be utilized in accordance with a gate monitoring system, according to an illustrative embodiment of the invention. A barcode 500 similar to that depicted in FIG. 5 may be placed on a vehicle 125 that enters the commercial or industrial site via the gate 120. The barcode 500 may then be utilized to monitor the vehicle 125 while the vehicle 125 is present at the commercial or industrial site.

FIG. 6 is one example flowchart of a method 600 for determining whether to open a gate monitored by a gate monitoring system, according to an illustrative embodiment of the invention. The operations described in the method 600 shown in FIG. 6 may be carried out by one or more of the components of a gate monitoring system, such as gate monitoring system 100, as desired in various embodiments of the invention. For example, in one embodiment, the operations may be carried out by a suitable processing station, such as processing station 110, that receives collected data from a communicator, such as communicator 105. As another example, the operations may be carried out by a data collection and monitoring center, such as data collection and monitoring center 810. As another example, the operations may be carried out by the communicator 105. As yet another example, the operations may be distributed among the communicator 105, the processing station 110, and/or the data collection and monitoring center 810.

The method 600 may begin at block 605. At block 605, which may be optional in certain embodiments of the invention, data associated with the vehicle 125 that is collected by the communicator 105 may be received from the communicator 105. For example, in certain embodiments, a processing station 110 or data collection and monitoring center 810 may receive the collected data from the communicator 105. Alternatively, in some embodiments, the communicator 105 may be utilized to analyze the collected data. In such a situation, the collected data may or may not be communicated to another component of the gate monitoring system 100.

At block 610, the collected tour data may be analyzed in order to identify any exceptions in the collected data. A wide variety of different types of exceptions may be identified as desired by analyzing the collected data. A few examples of exceptions that may be identified are discussed below with continued reference to FIG. 6; however, other exceptions may be identified in various embodiments of the invention, including but not limited to, the exceptions discussed above with reference to FIG. 1. Additionally, in various embodiments of the invention, the analysis of the collected data to identify certain types of exceptions may include comparing items of the collected data to expected values for the data.

At block 615, a determination may be made as to whether there are any driver exceptions in the collected data, including any driver's license exceptions and/or any TWIC exceptions. If one or more driver exceptions are identified at block 615, then operations may proceed to block 620. If, however, there are no driver exceptions identified at block 615, then operations may continue at block 625. At block 625, a determination may be made as to whether there are any bill of lading exceptions in the collected data. If one or more bill of lading exceptions are identified at block 625, then operations may proceed to block 620. If, however, there are no bill of lading exceptions identified at block 625, then operations may continue at block 630. At block 630, a determination may be made that no exceptions were identified from the collected or gathered data, and a signal or command to automatically open the gate 120 may be generated. The open signal may be communicated or transmitted to a gate actuator associated with the gate 120, such as gate actuator 115, and the gate actuator 115 may open the gate 120 and allow the vehicle 125 to pass through the gate. In various embodiments of the invention, exceptions other than those discussed with reference to FIG. 6 may be identified, and one or more of the other exceptions may be considered in making a determination as to whether the gate 120 will be automatically opened.

If one or more exceptions are identified in the collected data in either block 615 or block 625, then operations may proceed to block 620. At block 620, a determination may be made that the gate 120 cannot be automatically opened. Additionally, an exception alarm and/or an exception handling procedure may be generated for the identified exceptions. According to an aspect of the invention, a separate exception alarm and/or exception handling procedure may be generated for each identified exception; however, in various embodiments, a signal exception alarm and/or exception handling procedure may be generated for a plurality of identified exceptions. At block 635, a notification of an identified exception may be generated and communicated. A variety of notifications of identified exceptions may be generated as desired in various embodiments of the invention, for example, visual and/or audible notifications outputted or displayed at the processing station 110, visual and/or audible notifications that are communicated to and outputted/displayed by the communicator 105, and/or e-mail notifications that are communicated to the communicator 105, the processing station 110, and/or devices or systems remotely located to the gate monitoring system 100.

At block 640, a reason code may be received from one or more components of the gate monitoring system 100 and/or from one or more devices or systems external to the gate monitoring system 100. The reason code may constitute a reason code to close the exception alarm and/or the exception handling procedure. If a reason code is received at block 640, then operations may go to block 645. At block 645, the exception alarm and/or the exception handling procedure may be closed. Once the exception alarm and/or the exception handling procedure has been closed, in certain embodiments, the gate 120 may be opened. In other embodiments, the method 600 may end. Additionally, in certain embodiments, a reason code may not be received and the exception may remain opened.

The method 600 may end following block 630 or block 645.

The operations described in the method 600 of FIG. 6 do not necessarily have to be performed in the order set forth in FIG. 6, but instead may be performed in any suitable order. Additionally, in certain embodiments of the invention, more or less than all of the operations set forth in FIG. 6 may be performed. Furthermore, in various embodiments of the invention, the operations of FIG. 6 may be performed by the communicator 105, by the processing station 110, and/or by a device or system that is external to the gate monitoring system 100, for example, by the data collection and monitoring center 810 described below with reference to FIG. 8.

In various embodiments of the invention, at least a portion of the collected data may be maintained and stored by one or more components of a gate monitoring system, such as gate monitoring system 100. Additionally, as desired in various embodiments, a portion or all of the collected data may be communicated to external devices or systems in any suitable format (e.g., paper or electronic) for storage and/or additional processing. The collected data may also be utilized to satisfy a wide variety of different reporting requirements for manufacturers, suppliers, shippers, and/or recipients of goods. For example, in one embodiment, data may be collected for the cargo that is transported by vehicles 125 examined by the gate monitoring system 100. In some cases, this cargo may include human food products and/or animal feed, collectively referred to herein as food products. Data associated with the food products and/or the vehicle may be stored to facilitate data retention and reporting requirements implemented by the Food and Drug Administration (FDA). For example, the FDA may require records to be kept for food products, including records associated with the transportation of the food products and the dates that the food products were present at certain locations. The gate monitoring system 100 may assist in meeting these requirements by recording information, including types of food products and relevant dates, for food products that pass through a monitored gate, such as gate 120. This information may then be maintained by the gate monitoring system 100 or by an external device, system, and/or entity that receives the data from the gate monitoring system 100, such as, by a system associated with a manufacturer or shipping company.

According to an aspect of the invention, a gate monitoring system, such as gate monitoring system 100, may generate various types of reports associated with the data gathered from vehicles, such as vehicle 125, that are examined at a gate, such as gate 105. The various reports may be generated by any suitable components of the gate monitoring system, such as by the processing station 110 of the gate monitoring system 100. Additionally or alternatively, the various reports may be generated by another device or network station in communication with a component of the gate monitoring system 100. For example, a data collection and monitoring center 810, as described below with reference to FIG. 8, may receive gathered or collected data from the processing station 110 and/or from the communicator 105, and the data collection and monitoring center 810 may generate one or more reports associated with the data. FIGS. 7A-7D depict a few example reports that may be generated by a gate monitoring system 100, according to illustrative embodiments of the invention.

FIG. 7A depicts one example report 705 of vehicles that have entered an industrial or commercial site during a period of time. A similar report may be generated for vehicles that have exiting an industrial or commercial site during a period of time. The report 705 may be presented to a user as part of an appropriate graphical user interface via any suitable display device. The user may select or enter one or more sorting criterions into the graphical user interface. The report 705 of FIG. 7A may include one or more data entry or selection fields 710 that permit the user to enter sorting criterions into the report 705. As shown in FIG. 7A, the data entry or selection fields 710 may include, for example, a commercial or industrial site selection field, a trailer number data entry field, a trailer company selection field, a start date selection field, an end date selection field, and buttons to select incoming or outgoing traffic. Other types of data entry and/or data selection fields can be used in accordance with other embodiments of the invention.

With continued reference to FIG. 7A, one or more data or information items may be displayed in the report 705 according to the data entered in the data entry and selection fields. The displayed data may represent the vehicles or trailers that satisfy the arguments input into the data entry and selection fields. A wide variety of information may be displayed for each vehicle or trailer, such as, information associated with the carrier, the trailer number, the date and time that the trailer entered the commercial or industrial site, the seal number of the trailer upon entry, a most recent time that the trailer was identified as being present at the site, a date and time that the trailer exited the site, the seal number of the trailer at the exit time or the last identification time, the exit bill of lading number, and the destination of the trailer. Other information that may be displayed for each vehicle or trailer can be used in accordance with various embodiments of the invention.

FIG. 7B depicts one example report 715 of driver's license exceptions identified by a gate monitoring system, such as gate monitoring system 100. The driver's license exceptions may be sorted in a similar manner as that described above with reference to FIG. 7A. A variety of information may be presented or displayed for each identified driver's license exceptions, as desired in various embodiments of the invention. With reference to FIG. 7B, a carrier identification for the trailer, a recognition date of the exception, a vehicle class indication for the trailer or vehicle, a driver's name, a driver's license number, a driver's license issuance state, a driver's license expiration date, and a vehicle class for the driver's license may be displayed for each driver's license exception. Additionally, information associated with the type of identified exception may be displayed. For example, an indication may be displayed if the exception is an expired license exception. As another example, an indication may be displayed if the exception is a driver not permitted at the site exception. As yet another example, an indication may be displayed if the exception is a driver not licensed to operate the vehicle exception.

FIG. 7C depicts one example report 720 of potential or identified data entry errors. The report 720 of FIG. 7C may display discrepancies that are identified between data recorded when a vehicle or trailer enters the site and data recorded when a vehicle or trailer exits the site. Inconsistent data may be highlighted in the report 720 of FIG. 7C. Identified data inconsistencies may be utilized to identify exceptions associated with a vehicle. Additionally, data inconsistencies may be utilized to identify data entries that need to be corrected.

FIG. 7D depicts one example report 725 of the manual openings of a gate monitored by a gate monitoring system, such as gate 120. The data presented in the report 725 may be sorted in a similar manner to that described above with reference to FIG. 7A. As shown in FIG. 7D, the presented data may be sorted by distribution center, entry dates, and/or exit dates. Additionally, a variety of data may be presented or displayed in the report for each manual gate opening. As shown in FIG. 7D, a date, time, and guard on duty may be displayed for each manual gate opening. Other types of data and/or data combinations may be presented or displayed as desired in other embodiments of the invention.

According to an aspect of the invention, in addition to monitoring vehicles that enter and exit a site, such as a commercial or industrial site, vehicles may be monitored while they are present at the commercial or industrial site. FIG. 8 is a schematic diagram of one example vehicle yard monitoring system 800, according to an illustrative embodiment of the invention. The vehicle yard monitoring system 800 may include, among other components, a communicator 805 and a data collection and monitoring center 810. The communicator 805 may be utilized to collect data during the course of a guard tour of the vehicle yard. Once data is collected by the communicator 805, the data may be transmitted or otherwise communicated to the data collection and monitoring center 810 or other entity (e.g., the processing station 110 shown in FIG. 1) via one or more suitable networks 815. The data may be transmitted to the data collection and monitoring center 810 during the execution of a tour by a guard. For example, data collected for each vehicle at the vehicle yard be transmitted to the data collection and monitoring center 810 in real time, in approximate real time, or at a time that is proximately close to the time at which the data was collected. Alternatively, the communicator 805 may store data collected for one or more vehicles at the vehicle yard and communicate the stored data to the data collection and monitoring center 810 at a subsequent point in time. For example, data may be communicated to the data collection and monitoring center 810 after the tour of the vehicle yard is completed by the guard or at set intervals during the guard tour (e.g., at every other examined vehicle). It will also be appreciated that data may be communicated to the data collection and monitoring center 810 at predetermined time intervals during the completion of a vehicle yard tour, such as, every minute, every five minutes, etc.

The network 815 may be any appropriate network utilized to transmit data between the communicator 805 and the data collection and monitoring center 810. According to an aspect of the invention, the network 815 may be a cellular network. However, other types of networks may be utilized as desired in accordance with various embodiments of the invention, including but not limited to, one or more radio networks, one or more wired network connection, one or more LON WORKS network, any appropriate local area network, any appropriate wide area network (e.g., the Internet), etc.

The data collection and monitoring center 810 may store data received from the communicator 805 in one or more suitable memory devices. The data received by the data collection and monitoring center 810 may include data associated with the communicator 805 and/or data associated with one or more vehicles inspected on a tour of the vehicle yard. Data associated with the communicator 805 may include, for example, an identification number of the communicator 805, identification information for the guard that is utilizing the communicator 805 (e.g., the name of the guard, an operating number of the guard, or biometric information associated with the guard) and/or a current location of the communicator 805. The current location of the communicator may be a location derived from a cellular network for the communicator 805 and/or a global positioning system (GPS) coordinate for the communicator 805. The data associated with one or more inspected vehicles may include data that is scanned in from a unique barcode, such as barcode 600, that is associated with each vehicle and a slot number where the trailer is situated at the vehicle yard. A different barcode may be associated with each vehicle. Additionally, the data associated with a vehicle may include a time and date at which the vehicle is inspected, as explained in greater detail below with reference to FIGS. 11-13.

Additionally, the data collection and monitoring center 810 may analyze the received data in order to identify one or more exceptions that have occurred during the guard tour. In other embodiments of the invention, another device or component of the vehicle yard monitoring system 800 or an external system or device may be utilized as desired to analyze the data to identify one or more exceptions. One example of an exception that may be identified by the data collection and monitoring center 810 is a missing vehicle or missing trailer exception. A missing vehicle exception may be identified if a vehicle that should be present at the vehicle yard is not accounted for on the tour of the vehicle yard. For example, if a trailer has been recorded as having entered the vehicle yard but has not been recorded as having exited the vehicle yard, then a missing vehicle exception may be identified if information associated with the trailer is not recorded during a tour of the vehicle yard. Other types of exceptions may be identified by the data collection and monitoring center 810 as desired in various embodiments of the invention. For example, an exception may be recognized if a guard fails to visit a trailer slot that a vehicle yard tour includes as a trailer slot that should be visited.

In certain embodiments of the invention, a vehicle yard tour may be predetermined that specifies the order in which trailer slots or tour points are to be visited. Additionally, as desired in various embodiments, more than one predetermined vehicle yard tour may be specified. The one or more predetermined vehicle yard tours may be stored in a memory associated with the communicator 805 or, alternatively, a predetermined or predefined vehicle yard tour may be transmitted or otherwise communicated to the communicator 805 prior to the initiation of a vehicle yard tour. Additionally, in certain embodiments, a vehicle yard tour plan may be randomly selected or randomly defined prior to the initiation of a vehicle yard tour.

Once an exception has been identified by the data collection and monitoring center 810, the data collection and monitoring center 810 may communicate information identifying the exception to one or more persons and/or entities. For example, with reference to FIG. 8, the data collection and monitoring center 810 may communicate information identifying a recognized exception to a second communicator 820 via the network 815. The second communicator 820 may be operated by another guard on the premises or with a supervisor of the guard that is completing the tour. Additionally or alternatively, the data collection and monitoring center 810 may communicate instructions to the second communicator 820 following the identification of an exception. For example, another guard and/or a supervisor may be instructed to respond to a potential missing vehicle exception. Additionally, the data collection and monitoring center 810 may transmit instructions to the communicator 805 utilized by the guard conducting the tour following the identification of an exception. As an example, the guard may be instructed to search for the vehicle at one or more loading docks at the commercial or industrial site. As another example, the guard may be instructed to visit a missed tour point or missed trailer slot number. The data collection and monitoring center 810 may communicate with any number of communicators as desired in embodiments of the invention, such as communicators 805 and 820, via the network 815. Additionally, instructions or data may be transmitted to a communicator 805, 820 in any appropriate form, for example, a text message, a voice message, and/or an e-mail. According to one embodiment of the invention, two-way messaging functionality may be provided between a communicator 805, 820 and the data collection and monitoring center 810 via the network 815.

Additionally, the data collection and monitoring center 810 may communicate information associated with one or more identified exceptions to one or more persons and/or entities via one or more additional networks, such as network 835. As shown in FIG. 8, the data collection and monitoring center 810 may be in communication with a first network station 825 and a second network station 830 via network 835. The data collection and monitoring center 810 may communicate with any number of network stations via the second network 835 as desired in various embodiments of the invention. The network stations may be associated with a client whose premises are being monitored and protected by a company conducting the vehicle yard tours and/or the company conducting the vehicle yard tours. The second network 835 may be any appropriate network, for example, a wide area network (e.g., the Internet), one or more radio networks, one or more wireless network connections, one or more wired network connections, one or more LON WORKS network, one or more cellular networks, any appropriate local area network, any appropriate wide area network (e.g., the Internet), etc. As an example of communicating information associated with one or more identified exceptions, an e-mail may be communicated to a network station associated with a client when an exception is identified. As another example, an e-mail may be communicated to a network location associated with a manager of the data collection and monitoring center 810 when an exception is identified.

According to an aspect of the invention, the data collection and monitoring center 810 may store data associated with one or more completed vehicle yard tours. The data collection and monitoring center 810 may then generate a variety of reports utilizing the stored data. The generated reports may be similar to those explained above with reference to FIGS. 7A-7D.

Referring again to FIG. 8, it will be appreciated that the communicators 805, 820, the data collection and monitoring center 810, and/or the network stations 825, 830 may each comprise any suitable processor-driven device, such as a personal computer, laptop computer, handheld computer, minicomputer, personal data assistant, and the like. As such, each of these components of the vehicle yard monitoring system 800 may include a processor, a memory, one or more input/output ("I/O") interfaces, and a network interface that are similar to the components described above with reference to the gate monitoring system 100 of FIG. 1.

FIG. 9 is a block diagram of one example communicator 900 that may be utilized in accordance with a yard audit system, such as yard audit system 800, according to an illustrative embodiment of the invention. The communicator 900 may be similar to the communicator 105 described above with reference to FIG. 1 or to the communicator 200 described above with reference to FIG. 2. For example, in certain embodiments of the invention, the same communicator 900 may be used to collect data associated with a vehicle at a gate and to conduct a tour of a vehicle yard. However, in certain embodiments of the invention, differences may exist between the communicators utilized at a gate and to conduct tours of a vehicle yard. In one embodiment, the communicator 900 may be a digital communicator that is operable to communicate over a cellular network. In other words, the communicator 900 may include the functionality of a cellular telephone. The communicator 900 may be any appropriate device that is configured to collect or gather data associated with a vehicle or trailer during a vehicle yard tour. The communicator 900 may include a communicator control unit 905 and a memory 910. The communicator control unit 905 may control the operation of the communicator 900. The communicator control unit 905 may include any appropriate processing device or combination of processing devices, such as, a microcontroller, a minicomputer, an EPROM, or a processor. Further, the communicator control unit 905 may include software, hardware, firmware or any combination thereof The memory 910 may be in communication with the communicator control unit 905, and the memory 910 may be operable to store data gathered by the communicator 900 and/or programmed logic that is executable by the communicator control unit 905. The memory 910 may include any appropriate electronic storage device or combination of devices as desired in various embodiments of the invention, for example, a random access memory (RAM), a flash memory, or a magnetic data storage device.

The communicator control unit 905 may also incorporate or be in communication with one or more input/output (I/O) interfaces 915. The one or more I/O interfaces 915 may facilitate communication between the communicator control unit 905 and other components of the communicator 900 or with external devices. The one or more I/O interfaces 915 may facilitate communication between the communicator control unit 905 and components of the communicator 900 that are operable to gather or collect data.

According to one embodiment of the invention, the communicator 900 may include one or more data collection devices that may be in communication with the communicator control unit 905 via the one or more I/O interfaces 915. With reference to FIG. 9, the communicator 900 may include or incorporate one or more scanners 920, one or more cameras 925, and one or more keypads 930. Other data collection devices may be incorporated into the communicator 900 or be in communication with the communicator 900, such as, data ports, disk drives, network access points, touchpads, touchscreens, selectable displays, microphones, and/or voice recognition programs or software.

The one or more scanners 920 may be similar to those described above with reference to the communicator 200 described in FIG. 2. According to one embodiment of the invention, the one or more scanners 920 may include a barcode scanner that is operable to scan a unique barcode associated with each trailer located at the vehicle yard. Many different types of scanning devices and/or scanning techniques may be incorporated into or in communication with the communicator 900 as desired in various embodiments of the invention. For example, certain embodiments of the communicator 900 may utilize a camera 925 to scan a smart label or a barcode that is designed to be scanned by the camera 925 and/or to take pictures during a vehicle yard tour, for example, pictures of damage to a trailer. Other types of potential scanning devices will be readily apparent to those of skill in the art, for example, optical scanners.

In certain embodiments of the invention, the scanners 920 may include one or more suitable scanners for receiving biometric data associated with a guard or other user of the communicator 920. For example, the scanners 920 may include a digital fingerprint scanner and or a digital retinal scanner. Other types of biometric data scanners may be utilized in other embodiments of the invention as desired. In this regard, a guard or other user of the communicator 900 may be identified and or validated as an authorized user based at least in part on biometric data.

Each of the one or more cameras 925 may be similar to those described above with reference to the communicator 200 described in FIG. 2. Additionally, in certain embodiments of the invention, the guard may manually input data into the communicator 900 via the one or more keypads 930.

According to certain embodiments of the invention, the communicator 900 may include at least one video driver 935 and at least one display 940. The communicator control unit 905 may be operable to communicate data to a video driver 935, and the video driver 935 may be operable to drive an output to a display 940. A display 940 may be operable to present data to the guard that is utilizing the communicator 900. The display 940 may be any type of appropriate display, for example, a liquid crystal display (LCD). The display 940 may be operable to display instructions to the guard, including instructions that are associated with a vehicle yard tour. Additionally, the display 940 may be operable to display instructions to the guard that are received from a data collection and monitoring center, such as data collection and monitoring center 810, and/or a device or system in communication with a yard audit system, such as yard audit system 800. The display 940 may also be operable to display various menu options to a guard that are utilized during the completion of a vehicle yard tour. The display 940 may further be operable to display to the guard information or data that has been entered into the communicator 900 by the guard. For example, the display 940 may be operable to present text that has been entered by the guard. As another example, the display 940 may be operable to present a picture that has been taken with the camera 925 to the guard.

With continued reference to FIG. 9, the communicator 900 may also include one or more network interfaces 945 that are in communication with the communicator control unit 905. Each of the one or more network interfaces 945 may be any suitable interface that facilitates communication between the communicator 900 and other components of a yard audit system 800 and/or other external devices and systems. Many different types of network interfaces may be incorporated into the communicator 900 as desired in various embodiments of the invention. For example, the one or more network interfaces 945 may include a cellular network interface that facilitates communication with a data collection and monitoring center 810 via a cellular network, for example, the cellular network 815 discussed above with reference to FIG. 8.

A wide variety of devices may be utilized as desired to function as a communicator 900 in a yard audit system 800. One example device may be a Motorola i355 device that incorporates or is in communication with one or more scanners. Another example device may be a Motorola i580 device that incorporates or is in communication with one or more scanners. Other example devices can be utilized by other embodiments of the invention. Additionally, a device similar to that described above with reference to FIG. 2 may also be utilized as the communicator 900 of a yard audit system 800.

FIG. 10 is a schematic diagram of one exemplary vehicle yard audit tour 1000 that may be conducted utilizing a yard audit system, such as yard audit system 800, according to an illustrative embodiment of the invention. The example vehicle yard shown in FIG. 10 may include a gatehouse 1005, a facility 1010, and one or more loading docks 1015. One or more vehicles 1020 may be located at trailer slots situated around the vehicle yard and at least one vehicle 1025 may be in a queue at the gatehouse 1005. As shown in FIG. 10, a variety of tour points may be established at a vehicle yard that is monitored by a yard audit system 800. Each tour point may correspond to a vehicle or trailer slot located at the vehicle yard. At each tour point, one or more unique barcodes associated with a trailer may be scanned. A guard may visit each of the tour points during the completion of the yard audit tour. By scanning each barcode, it may be determined whether or not any trailers are missing. Once example of the operations that may be conducted during a yard audit tour is discussed below with reference to FIG. 11.

FIG. 11 is one example flowchart depicting the operation of a communicator utilized in conjunction with the yard audit system, such as communicator 900, in accordance with an illustrative embodiment of the invention. A method 1100 for conducting a vehicle yard tour is set forth in FIG. 11. Prior to the commencement of a vehicle yard tour, a tour plan may be presented to the guard by a suitable communicator, such as communicator 900. Once a tour plan has been determined and/or presented to the guard, the method 1100 may begin at block 1105. Additionally, a guard's identity may be verified prior to the commencement of a vehicle yard tour. The guard's identity may be verified utilizing a wide variety of techniques and/or devices as desired in various embodiments of the invention. For example, the guard's identity may be verified by the guard inputting an identification number and/or password into the communicator 900. As another example, the guard's identity may be verified by the guard utilizing one or more scanner associated with the communicator 900 to enter biometric data, such as, a fingerprint scan, retinal scan, etc.

At block 1105, once a vehicle yard tour is commenced, a guard may proceed with the communicator 900 to the next vehicle or trailer slot at block 1105. Once the next vehicle is reached, the guard may utilize a scanner of the communicator 900 to scan a barcode associated with the vehicle or trailer at block 1110.

Following the scanning of the barcode at block 1110, a determination may be made at block 1115 as to whether or not any additional input is required for the vehicle or trailer. For example, if the trailer is a refrigerated trailer, the guard may be prompted to enter information associated with the temperature of the trailer. As another example, the guard may be prompted to enter information associated with the amount or gasoline remaining in a gas tank associated with the trailer. If it is determined at block 1115 that no additional information or data input is required or desirable, then operations may continue at block 1130. If, however, it is determined at block 1115 that additional input is required or desirable, then operations may continue at block 1120, and the guard may be prompted for the additional information. Following the prompting of the guard for additional input at block 1125, the communicator 900 may receive the input at block 1125 and proceed to block 1130.

At block 1130, the communicator 900 may transmit or otherwise communicate gathered or collected information to a suitable data processing system or component, such as data collection and monitoring center 810. Once the data has been transmitted to the data collection and monitoring center 810, the communicator 900, at block 1135, may optionally receive data and/or instructions from the data collection and monitoring center 810 in response to the transmitted data. A portion or all of the data or instructions received at block 1135 may be displayed to the guard by the communicator 900. Appropriate action may be taken by the guard in accordance with received instructions.

At block 1140, a determination may be made as to whether or not the vehicle yard tour is complete. If it is determined at block 1140 that the vehicle yard tour has not been completed, then operations may continue at block 1105 and the guard may be instructed to proceed to the next vehicle or trailer slot. If, however, at block 1140, it is determined that the vehicle yard tour has been completed, then operations may cease until the next scheduled vehicle yard tour.

The method 1100 may end following a determination at block 1140 that a vehicle yard tour has been completed.

The operations described in the method 1100 of FIG. 11 do not necessarily have to be performed in the order set forth in FIG. 11, but instead may be performed in any suitable order. Additionally, in certain embodiments of the invention, more or less than all of the operations set forth in FIG. 11 may be performed.

FIG. 12 is one example flowchart depicting a method 1200 for processing data collected during a vehicle yard tour to determine if any exceptions exist. The processing of collected data may be carried out by any suitable components or systems as desired in various embodiments of the invention, such as, by the data collection and monitoring center 810 described with reference to FIG. 8. As another example, the data processing may be conducted by a communicator utilized to conduct the tour, such as communicator 900 or communicator 805. As yet another example, the data processing may be conducted by the processing system 110 described above with reference to FIG. 1.

With reference to FIG. 12, the method 1200 may begin at block 1205, which may be optional in certain embodiments of the invention depending on the system or component conducting the data processing. At block 1205, data associated with an ongoing or completed guard tour may be received from a communicator 900 that is utilized to collect the data. For example, the collected data may be received by a data collection and monitoring center 810. Following the receipt of data at block 1205, operations may proceed to block 1210 and the collected tour data may be analyzed for one or more exceptions. The data may be analyzed for a wide variety of different exceptions as desired in various embodiments of the invention, such as, missing trailer exceptions, etc.

At block 1215, a determination may be made as to whether or not any exceptions are identified in the tour data. If no exceptions are identified at block 1215, then operations may cease until additional yard audit data is collected and/or received. If, however, exceptions are identified at block 1215, then operations may proceed to block 1320. At block 1220, an alarm associated with each identified exception may be generated. Additionally, an exception handling procedure may be initiated for each of the identified exceptions. An alarm and an exception handling procedure may remain open until an appropriate reason code is entered and/or received to close the exception alarm and/or the exception handling procedure.

In certain embodiments, a generated exception handling procedure may be configured to contact one or more persons and/or entities regarding one or more exception. Additionally, an exception handling procedure may be configured to escalate an exception over time until an appropriate reason code is received and/or entered to close the exception alarm and/or the exception handling procedure. An example exception handling procedure is described in U.S. patent application Ser. No. 11/218,175, entitled "Supervised Guard Tour Tracking Systems and Methods," the disclosure of which is incorporated by reference herein in its entirety. The generated exception handling procedure may send notifications and/or instructions concerning the identified exception. The notifications and/or instructions may include many different types of messages, for example, text messages, e-mails, and voice messages.

With continued reference to FIG. 12, notifications of one or more identified exceptions may be transmitted or otherwise communicated to one or more persons and/or entities at block 1225. The notifications may be transmitted to many different persons and/or entities as desired in various embodiments of the invention, for example, the guard conducting the tour, the guard's supervisor, a supervisor of the data collection and monitoring center 810, and/or a client. At block 1230, a reason code associated with the identified exception may be received, and operations may proceed to block 1235. At block 1235, the exception alarm and/or exception handling procedure may be closed in response to the received reason code. Once all of the open exception alarms and exception handling procedures have been closed, the method 1200 may cease until additional tour data is received.

The operations described in the method 1200 of FIG. 12 do not necessarily have to be performed in the order set forth in FIG. 12, but instead may be performed in any suitable order. Additionally, in certain embodiments of the invention, more or less than all of the operations set forth in FIG. 12 may be performed.

According to certain embodiments of the invention, an escalation system may also be utilized to monitor the receipt of notifications or messages that are transmitted to one or more individuals and/or entities. For example, an escalation system may be utilized to monitor the receipt of messages that are sent to the guard, messages that are sent to the guard's supervisor, and/or messages that are sent to a client. The message escalation system may be utilized to ensure that a notification or message is delivered and that a response is received for the message. As an example, a message may be transmitted to a guard once an exception is identified. If a reply is not received from the guard within a predetermined period of time, then the message may be escalated. Any predetermined period of time may be utilized to escalate exception, for example, two minutes, five minutes, etc.

Once a message has been escalated, an additional message may be transmitted by the escalation system. In this regard, one or more additional messages may be transmitted to various individuals and/or entities until an appropriate reply is received. For example, a second message may be transmitted to the guard by the escalation system. Additionally and/or alternatively, a second message may be transmitted to a next contact person selected from a predetermined contact list, for example, the guard's supervisor. The message system may continue to escalate messages until a reply is received. For example, if a reply is not received from the guard's supervisor, a message may be transmitted to a security company supervisor and, if a reply is not received from the security company supervisor, a message may be transmitted to a client or owner of the property on which the guard tour is being conducted, and so on until a reply is received. Any number of messages may be transmitted or communicated at each escalation level. Furthermore, a contact list that is utilized may be a generic contact list or a contact list that is specific to one or more types of identified exceptions.

FIG. 13 is one example of a message 1300 that may be communicated when an exception is identified by a yard audit system, such as yard audit system 800, according to an illustrative embodiment of the invention. The message 1300 depicted in FIG. 13 is an example e-mail message that may be communicated following the identification of a missing trailer exception. The message 1300 may include information concerning the trailer that is missing or potentially missing. Additionally, the message 1300 may include information concerning the last time that the trailer was inventoried at the commercial or industrial site. The message 1300 may be communicated or otherwise transmitted to any number of different persons or entities, for example, to the guard conducting the tour of the vehicle yard, to a supervisor of the guard, to a guard monitoring a gate, such as gate 120, to a supervisor of a security company that is monitoring the commercial or industrial site, to the owner of the commercial or industrial site, and/or to the carrier of the trailer. Other types of messages indicating an identified exception can be utilized as desired in other embodiments of the invention.

The invention is described above with reference to block diagrams and flowchart illustrations of systems, methods, apparatuses and computer program products according to embodiments of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions above.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams and flowchart illustrations support combinations of means for performing the specified functions, combinations of elements or steps for performing the specified functions and program instruction means for performing the specified functions. It will also be understood that each block of the block diagrams, and combinations of blocks in the block diagrams, can be implemented by special purpose hardware-based computer systems that perform the specified functions, elements or steps, or combinations of special purpose hardware and computer instructions.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A communicator for use in a guard tour, the communicator comprising:
at least one scanning device configured to collect information associated with a plurality of vehicles or trailers during completion of a guard tour;
at least one network interface configured to (i) communicate at least a portion of the collected information to a remote processing station via a network, and (ii) receive an instruction associated with an identified exception based at least in part on the at least a portion of collected information; and at least one processor configured to (i) direct a guard to utilize the at least one scanning device to collect information associated with the plurality of vehicles or trailers, wherein the information comprises a first number of manual openings, a second number of emergency openings, and a third number of automatic openings of a gate associated with a site at which the plurality of vehicles or trailers is parked, (ii) compare a first total comprising the first number, the second number, and the third number to a second total of a number of openings of the gate, (iii) identify the exception when the first total does not equal the second total, (iv) prompt the guard to collect additional information based at least in part on the instruction, and (v) direct the at least one network interface to communicate the collected information and the collected additional information to the remote processing station.

2. The communicator of claim 1, wherein the guard is prompted to collect one of (i) a temperature of a refrigerated trailer or (ii) an amount of fuel remaining in a fuel tank associated with a trailer.

3. The communicator of claim 1, wherein the instruction comprises a first instruction, wherein the at least one network interface is further configured to receive a second instruction from the remote processing station based upon an evaluation of at least one of the information or the additional information, the second instruction associated with the identified exception, and wherein the at least one processor is further configured to output at least one of the first instruction or the second instruction for presentation to the guard.

4. The communicator of claim 1, wherein the identified exception comprises one of (i) an exception associated with a missing vehicle or a missing trailer or (ii) an exception associated with a missed guard tour point.

5. The communicator of claim 3, wherein the second instruction comprises one of (i) an instruction to visit a missed guard tour point or (ii) an instruction to search for a missing vehicle or a missing trailer.

6. A system, comprising:
a communicator configured to collect data associated with a plurality of vehicles or trailers during completion of a guard tour; and
a processing station configured to (i) receive the collected data from the communicator, wherein the collected data comprises a first number of manual openings, a second number of emergency openings, and a third number of automatic openings of a gate associated with a site at which the plurality of vehicles or trailers is parked, (ii) compare a first total comprising the first number, the second number, and the third number to a second total of a number of openings of the gate, (iii) identify at least one exception when the first total does not equal the second total, (iv) generate one or more instructions based at least in part on the identified at least one exception to be returned to the communicator, the one or more instructions comprising an instruction to collect additional data associated with a vehicle or trailer, and (v) communicate the generated one or more instructions to the communicator.

7. The system of claim 6, wherein the instruction to collect additional information comprises one of (i) an instruction to collect a temperature of a refrigerated trailer or (ii) an instruction to collect an amount of fuel remaining in a fuel tank associated with a trailer.

8. The system of claim 6, wherein the communicator and the processing station communicate in real-time via a cellular network.

9. The system of claim 6, wherein the identified at least one exception comprises one of (i) an exception associated with a missing vehicle or a missing trailer or (ii) an exception associated with a missed guard tour point.

10. The system of claim 6, wherein the one or more instructions further comprise one of (i) an instruction to visit a missed guard tour point or (ii) an instruction to search for a missing vehicle or a missing trailer.

11. The system of claim 6, wherein the communicator comprises a first communicator associated with a first guard, and wherein the processing station is further configured to communicate an alert associated with the identified at least one exception to a second communicator associated with a second guard.

12. A method, comprising:
receiving, by a processing station from a communicator carried by a guard during a guard tour, data collected by the communicator and associated with a plurality of vehicles or trailers evaluated during completion of the guard tour, wherein the collected data comprises a first number of manual openings, a second number of emergency openings, and a third number of automatic openings of a gate associated with a site at which the plurality of vehicles or trailers is parked;
determining, by the processing station, at least one exception based at least in part on a comparison of a first total comprising the first number, the second number, and the third number to a second total of a number of openings of the gate;
generating, by the processing station, one or more instructions based at least in part on the identified at least one exception to be returned to the communicator, the one or more instructions comprising an instruction to collect additional data associated with a vehicle or trailer; and
communicating, by the processing station to the communicator, the generated one or more instructions.

13. The method of claim 12, wherein the instruction to collect additional information comprises one of (i) an instruction to collect a temperature of a refrigerated trailer or (ii) an instruction to collect an amount of fuel remaining in a fuel tank associated with a trailer.

14. The method of claim 12, wherein the communicator and the processing station communicate in real-time via a cellular network.

15. The method of claim 12, wherein the identified at least one exception comprises one of (i) an exception associated with a missing vehicle or a missing trailer or (ii) an exception associated with a missed guard tour point.

16. The method of claim 12, wherein the one or more instructions further comprises one of (i) an instruction to visit a missed guard tour point or (ii) an instruction to search for a missing vehicle or a missing trailer.

17. The method of claim 12, wherein the communicator comprises a first communicator associated with a first guard, and further comprising:
communicating, by the processing station, an alert associated with the identified at least one exception to a second communicator associated with a second guard.

18. The communicator of claim 1, wherein the collected additional information comprises at least one of a planned arrival time of the plurality of vehicles or trailers, a planned departure time of the plurality of vehicles or trailers, or information associated with a bill of lading for the plurality of vehicles or trailers.

19. The system of claim 6, wherein the instruction comprises a first instruction, and wherein the processing station is further configured to:
   receive the additional data; and
   communicate a second instruction based on an evaluation of the additional data to a gate actuator, the second instruction causing the gate actuator to open the gate.

20. The method of claim 12, wherein the instruction comprises a first instruction, and wherein the method further comprises:
   receiving, by the processing station, the additional data;
   communicating, by the processing station, a second instruction based on an evaluation of the additional data to a gate actuator that causes the gate actuator to open the gate.

* * * * *